(12) United States Patent
Paterson et al.

(10) Patent No.: US 11,779,077 B2
(45) Date of Patent: Oct. 10, 2023

(54) SOLE COMPRISING INDIVIDUALLY DEFLECTABLE REINFORCING MEMBERS, SHOE WITH SUCH A SOLE, AND METHOD FOR THE MANUFACTURE OF SUCH ITEMS

(71) Applicant: adidas AG, Herzogenaurach (DE)

(72) Inventors: Robbie Paterson, Nuremberg (DE); Harry Miles, Nuremberg (DE); Daniel Ruiz, Erlangen (DE); Fabian Schweizer, Nuremberg (DE); Sam Forester, Nuremberg (DE); Falk Bruns, Nuremberg (DE); Peter Valdivia, Nuremberg (DE); Jochen Bartl, Langensendelbach (DE); Tobias Biegel, Großhabersdorf (DE); Valentin Perrin, Nuremberg (DE); Jürgen Weidl, Aurachtal (DE); Matthias Schmitt, Nuremberg (DE); Heiko Schlarb, Neustadt an der Aisch (DE); Alejandro Alcaniz, Nuremberg (DE); Ronny Herman Gerard Groeneveld, Vreden (DE)

(73) Assignee: adidas AG, Herzogenaurach (DE)

( * ) Notice: Subject to any disclaimer, the term of this patent is extended or adjusted under 35 U.S.C. 154(b) by 210 days.

(21) Appl. No.: 17/179,785

(22) Filed: Feb. 19, 2021

(65) Prior Publication Data
US 2021/0259358 A1 Aug. 26, 2021

(30) Foreign Application Priority Data

Feb. 21, 2020 (DE) .................... 10 2020 202 237.2
Jan. 15, 2021 (EP) ...................... 21151933

(51) Int. Cl.
*A43B 13/14* (2006.01)
*A43B 5/06* (2022.01)
(Continued)

(52) U.S. Cl.
CPC ............... *A43B 13/14* (2013.01); *A43B 5/06* (2013.01); *A43B 7/14* (2013.01); *A43B 7/1445* (2013.01);
(Continued)

(58) Field of Classification Search
CPC .......... A43B 7/14; A43B 7/1445; A43B 13/14
(Continued)

(56) References Cited

U.S. PATENT DOCUMENTS 1,848,518 A * 3/1932 Doran et al. ........... A43B 7/142
36/76 R
2,129,424 A 5/1936 Jay
(Continued)

FOREIGN PATENT DOCUMENTS

CN 101212914 A 7/2008
CN 102665467 B 7/2015
(Continued)

*Primary Examiner* — Marie D Bays
(74) *Attorney, Agent, or Firm* — Sterne, Kessler, Goldstein & Fox P.L.L.C.

(57) ABSTRACT

A sole for a shoe, the sole comprising reinforcing members extending in a front half of the sole, wherein at least a first one of the reinforcing members further extends rearwardly beyond a midfoot area and into a heel area of the sole and wraps up to a posterior portion of an ankle region. A shoe, in particular a running shoe, comprising such a sole. A method for the manufacture of such items.

13 Claims, 26 Drawing Sheets

(51) Int. Cl.
  *B29D 35/00* (2010.01)
  *B29D 35/12* (2010.01)
  *A43B 7/1445* (2022.01)
  *A43B 7/14* (2022.01)

(52) U.S. Cl.
  CPC ....... *B29D 35/0009* (2013.01); *B29D 35/122* (2013.01)

(58) Field of Classification Search
  USPC ............................... 36/25 R, 88, 72 R, 72 A
  See application file for complete search history.

(56) References Cited

U.S. PATENT DOCUMENTS

| | | | | |
|---|---|---|---|---|
| 3,999,558 | A * | 12/1976 | Barnwell | A43B 7/142 36/145 |
| 4,441,499 | A * | 4/1984 | Comparetto | A43B 7/1415 36/154 |
| 4,941,273 | A * | 7/1990 | Gross | A43B 23/08 36/105 |
| 5,311,680 | A * | 5/1994 | Comparetto | A43B 7/1435 36/43 |
| 5,647,145 | A | 7/1997 | Russell et al. | |
| 6,000,148 | A * | 12/1999 | Cretinon | A43B 5/002 36/88 |
| 6,502,330 | B1 | 1/2003 | David et al. | |
| 6,954,998 | B1 | 10/2005 | Lussier | |
| 6,968,637 | B1 * | 11/2005 | Johnson | A43B 3/0063 36/108 |
| 7,401,422 | B1 | 7/2008 | Scholz et al. | |
| 8,117,770 | B2 * | 2/2012 | Wong | A43B 7/18 36/114 |
| 8,505,220 | B2 * | 8/2013 | James | A43B 13/181 36/102 |
| 8,613,150 | B2 * | 12/2013 | Wong | A41B 11/003 36/114 |
| 8,776,401 | B2 * | 7/2014 | James | A43B 13/18 36/102 |
| 9,044,064 | B2 * | 6/2015 | Baucom | A43B 5/00 |
| 9,241,535 | B2 | 1/2016 | Baudouin et al. | |
| 9,491,983 | B2 * | 11/2016 | Rushbrook | A43B 13/16 |
| 9,603,416 | B1 * | 3/2017 | Walsh | A63B 22/02 |
| 10,470,518 | B1 | 11/2019 | Walsh et al. | |
| 2002/0050078 | A1 * | 5/2002 | Dietrich | A43B 7/24 36/31 |
| 2005/0034328 | A1 | 2/2005 | Geer | |
| 2005/0268489 | A1 | 12/2005 | Austin | |
| 2007/0266598 | A1 * | 11/2007 | Pawlus | A43B 13/16 36/76 R |
| 2009/0000150 | A1 * | 1/2009 | Wong | A43B 5/06 36/89 |
| 2009/0056165 | A1 | 3/2009 | Lee | |
| 2009/0183393 | A1 | 7/2009 | Lee | |
| 2010/0199523 | A1 | 8/2010 | Mayden et al. | |
| 2010/0293816 | A1 | 11/2010 | Truelsen | |
| 2011/0214313 | A1 * | 9/2011 | James | A43B 13/14 36/103 |
| 2013/0118035 | A1 * | 5/2013 | Segato | A43B 13/16 36/102 |
| 2014/0245640 | A1 * | 9/2014 | Heard | A43B 3/0052 36/88 |
| 2014/0259747 | A1 | 9/2014 | Baudouin et al. | |
| 2015/0366290 | A1 * | 12/2015 | Chang | A43B 7/14 36/114 |
| 2016/0029746 | A1 * | 2/2016 | Rushbrook | A43C 1/06 36/97 |
| 2016/0051009 | A1 * | 2/2016 | Kormann | A43B 5/08 36/103 |
| 2017/0035143 | A1 | 2/2017 | Sato et al. | |
| 2017/0095034 | A1 | 4/2017 | Dupre et al. | |
| 2018/0213886 | A1 | 8/2018 | Connell et al. | |
| 2019/0159547 | A1 * | 5/2019 | Nakatsuka | A43B 13/185 |
| 2019/0200699 | A1 * | 7/2019 | Ghiotti | A43B 17/006 |
| 2019/0365030 | A1 * | 12/2019 | Chambers | A43B 3/0036 |
| 2020/0214384 | A1 * | 7/2020 | Gruben | A43B 3/38 |
| 2021/0259358 | A1 * | 8/2021 | Paterson | A43B 13/14 |
| 2022/0117355 | A1 * | 4/2022 | Smith | A43B 23/22 |
| 2022/0378147 | A1 * | 12/2022 | Bruns | A43B 13/127 |

FOREIGN PATENT DOCUMENTS

| | | |
|---|---|---|
| CN | 105831874 B | 5/2018 |
| CN | 108783746 A | 11/2018 |
| CN | 105380340 B | 12/2018 |
| DE | 600 27 500 T2 | 5/2007 |
| EP | 1 842 441 B1 | 7/2011 |
| EP | 1 906 783 B1 | 9/2012 |
| JP | 2015-208504 A | 11/2015 |
| JP | 2015533591 A | 11/2015 |
| JP | 2018-534028 A | 11/2018 |
| WO | 2007/010253 A1 | 1/2007 |
| WO | WO2015124523 A1 | 8/2015 |
| WO | 2018/017893 A1 | 1/2018 |

* cited by examiner

SOLE COMPRISING INDIVIDUALLY DEFLECTABLE REINFORCING MEMBERS, SHOE WITH SUCH A SOLE, AND METHOD FOR THE MANUFACTURE OF SUCH ITEMS

TECHNICAL FIELD

Embodiments of the present invention relate to a sole for a shoe, in particular for a running shoe. Embodiments of the present invention also relate to a shoe, in particular a running shoe, comprising such a sole. Embodiments of the present invention further relate to a method for the manufacture of such items.

BACKGROUND

A shoe sole typically serves a number of different functions, such as cushioning of the impact forces occurring upon foot strike and providing traction to avoid slipping of the wearer's foot. Another function a shoe sole typically serves is to provide a degree of stability to the wearer's foot, so that the danger of twisting one's ankle or other kinds of injuries, for example injury to the plantar fascia or muscle overloading, etc., are reduced. Still another function of a shoe sole, particularly for performance footwear like running shoes, is to facilitate a good transmission of forces from the athlete's legs through their feet to the ground and an efficient running style, in order to improve the athlete's performance.

To address the mentioned stability and performance issues in running shoes, shank elements, torsion systems, stiffening plates, etc., have been considered. However, one weakness of these constructions is that they result in shoes with high rigidity and stiffness, leading to a running experience that is not very ergonomic. It has also been observed that footwear constructions known from the art do not cater to specific anatomical landmarks in the foot. Such constructions tend to artificially restrict and restrain the feet to a plane, allowing only a fixed degree of movement and an unnatural push-off while running. This may lead to straining or using the joints in the leg and the foot in a way that might cause discomfort or even injuries in the long run.

On the other hand, a stabilizing element with five stabilizing members that extend from a connecting member is known from U.S. Pat. No. 6,968,637 B1. However, this stabilizing element is located primarily in the midfoot region. This entails the problem of insufficient support in the toe-off area of the sole, for example, which is an important factor when it comes to a dynamic and energy-efficient push-off of the foot during running.

US 2005/0268489 A1 describes a resilient shoe lift incorporating a series of lever rods stabilized by bars and integrally molded into the structure of a shoe sole.

EP 1 906 783 B1 describes a sole comprising at least three elongate elements oriented longitudinally within the horizontal plane of the sole and adapted to increase in rigidity in response to an increase in longitudinal tension of the sole.

U.S. Pat. No. 6,502,330 B1 describes a sole which includes a strengthener in the form of a closed loop which surrounds the zone on which the heel rests and is extended forward in the form of two branches extending along the two edges of the sole at least as far as the zone of the first and fifth metatarsal heads.

SUMMARY OF THE INVENTION

The above-outlined problems are addressed and are at least partly solved by various aspects of the present disclosure.

Based on the background discussed above, it is a purpose of the present disclosure to provide a reinforcing structure for a sole for a shoe, in particular for a running shoe, that improves on and overcomes at least some of the drawbacks of the known constructions mentioned above. A particular goal of the present disclosure is to provide a reinforcing structure that accounts for the physiology of a wearer's feet and that facilitates a natural and enjoyable running experience and helps to lower the risk of injuries. A further problem addressed by the present disclosure is to provide a method of manufacture for such a reinforcing structure and/or shoe sole.

According to a first aspect of the present disclosure, a sole for a shoe is provided.

The sole can, in particular, be used in a running shoe. However, the sole can also be used in different kinds of shoes, in particular other kinds of sports shoes, and its use is not limited to running shoes. For example, the sole can be used in shoes for track-and-field, shoes for long jump, shoes for sprinting or short distance track races, shoes for hurdle races, shoes for mid- or long-distance track races, and so on. The sole can also be used in non-sports shoes.

In an embodiment, the sole comprises at least two reinforcing members extending in a front half of the sole, wherein the reinforcing members are configured to be independently deflected by forces acting on the sole during a gait cycle.

It may be desirable to provide sufficient stiffness and cushioning around the toe area of the foot in order to reduce motion and fatigue, and also at the metatarsophalangeal joints (MTP joints) and the $1^{st}$ metatarsal bone in order to avoid stress overload. By extending in the front half of the sole, the reinforcing members may adequately support and stabilize the toes and toe joints, which are put under high loads during running, thereby helping to reduce overloading on key anatomical landmarks and muscle groups.

The reinforcing members may further help in reducing the eccentric work created during running, which in turn may help reduce the energy lost by an athlete, which may reduce the work done at the MTP-, knee-, ankle- and hip joints. Less work done means less fatigue and less overloading or overuse injuries to the wearer of such a shoe. The reinforcing members can also cater to the anatomy and physiology of the foot, unlike previously known rigid or unitary elements, such as those discussed in the Background.

In addition, when acting together, the reinforcing members can also provide a stabilizing platform for the foot to land on, giving the user a smooth running experience. The stability may be attained, for example, through a stiff, rod-like or tube-like structure of the reinforcing members.

In summary, the reinforcing members according to the present disclosure take account of the human foot structure and its anatomy in order to provide biomechanical protection, motion and ease. In other words, by complementing the natural shape and anatomy of the foot, the reinforcing members improve the foot-to-ground interface, increasing the smoothness of rolling and lessening the impact forces, thus reducing overload on the structure of the foot and muscle groups. This can help the wearer to achieve a smoother and more natural running gait.

Further still, by having several reinforcing members and having the individual reinforcing members react and respond independently to the forces occurring during a gait cycle, their reinforcing function can be controlled and tailored to the specific needs of a runner in more detail than if a simple singular reinforcing element is used. The individual reinforcing members can cater to specific anatomical landmarks in the foot, such as each individual metatarsal structure. For example, the stiffness of each reinforcing member can cater to such anatomical landmarks. All in all, using individual reinforcing members, acting alone and/or in combination with each other, can stabilize the sole and the shoe in a longitudinal direction, while at the same time also allowing a biomechanically preferred movement of the foot, ankle and surrounding sub-structures during the stance phase of the gait cycle when running.

Another benefit of using the disclosed reinforcing members, which may be suspended in a midsole material such as a soft foam material, is that they may allow the foot to move from a lateral to a medial side and vice versa with more control. Since each reinforcing member element can move independently of the other, the foot will not move and twist as quickly, but a controlled freedom is provided instead. The following analogy may be used to further elaborate on this effect: when playing a piano using the five fingers, each finger can hit one key without the other keys being pressed down, so moving from left to right can be done at a slower speed and with greater control over each key. On the other hand, if a single unitary structure were to be used, for example a flat bar or a plate, instead of five individual fingers, little control could be exercised over how many keys are being pressed, and in reality it would most likely be only possible to press the various keys all at the same time. Similarly, with the help of the individual reinforcing members of the present disclosure, each member can be individually activated from a lateral to a medial side during running to create a smooth and stable ride, whereas a unitary structure activates at once and thus could be less stable and provide less controllability.

Different geometries and cross-sectional shapes are possible for the reinforcing members. The cross-sectional shape may also vary along different sections of a given reinforcing member or it may vary between different reinforcing members. The cross-sectional shape may vary along different sections of a given reinforcing member and between different reinforcing members. Examples of possible cross-sectional shapes for the reinforcing members or sections of the reinforcing members include, but are not limited to, circular, elliptic, prismatic, trapezoid, quadratic, rectangular, and the reinforcing members may be rod- or tube-shaped, or plate-like (or contain sections with such a shape), as will be discussed in more detail in the remainder of this document.

Each of the reinforcing members may comprise a non-linear section.

In this context, "non-linear" means not extending along a straight line. In other words, each of the reinforcing members can have a section that is curved or bent. Kinks or sharp bends, for example, are also possible but generally less preferred.

For reinforcing members that have, for example, a circular cross-section, it is evident how to determine whether they follow a straight line or not. However, for reinforcing members that have a different cross-section, for example plate-like reinforcing members as further discussed below, the term "flow-line of the reinforcing member" will be used in the following to describe the general shape and geometry of the reinforcing member. The flow-line of a given reinforcing member can be considered as a line running through the center of the reinforcing member (or through the center of each section of the reinforcing member, if the cross-sectional shape of the reinforcing member varies across different sections of the reinforcing member).

A more rigorous way, mathematically speaking, of defining the flow-line for a reinforcing member irrespective of its cross-sectional shape would be, for example, to divide the reinforcing member lengthwise into a plurality of slices of constant thickness (e.g., of thickness 1 mm, or 2 mm, or 5 mm, or so on, depending on the desired degree of accuracy), determine the center of mass for each slice and mark it with a point, piece the reinforcing member back together, and then connect all of the points thus determined. The resulting line can then be considered the flow-line of the reinforcing member. While the above-described process can, in principle, be physically performed by actually cutting the reinforcing member into pieces, usually a computer simulation will be employed to do this virtually and without having to destroy the reinforcing member. Suitable processes and devices (e.g., 3D-scanners) to this end are known to a person of ordinary skill in the art and will not be further discussed here.

Irrespective of the cross section of the reinforcing members, then, the center line or flow-line of a non-linear reinforcing member does not follow a straight line.

However, a given reinforcing member may also comprise a linear (i.e., straight) section or sections in addition to the non-linear section or sections, or the entire reinforcing member may be non-linear. Linear and non-linear sections may also alternate. Moreover, combinations of reinforcing members with and without such straight sections are also possible within a sole. These statements remain applicable for the following discussion, where more specific shapes and geometries of the reinforcing members are discussed, even if not explicitly repeated again.

Using non-linear sections in the reinforcing members may allow the reinforcing members, for example, to follow the general shape and anatomy of the foot and hence to provide adequate support, stability and guidance of the foot and the surrounding sub-structures, thus helping to prevent injuries, overloading of joints, and fatigue, and to generally promote a good roll-off behavior of the sole.

For example, each of the reinforcing members may comprises a section having a concave shape in a side view of the sole (when the sole sits on a flat piece of ground or a table in a force-free state without being bent or twisted, and is looked at from the medial or lateral side).

A "concave shape" is understood in the context of the present disclosure as a shape akin to a bowl, or a saucer, or a ladle, i.e., a shape in which water would gather, and not be expelled.

Pictorially speaking, therefore, the reinforcing members may provide a 'bowl shape' or 'saucer shape' or 'ladle shape' in the front half of the foot, in which the toes and, in particular, the metatarsal bones and the metatarsophalangeal joints (MTP joints) can rest, thus avoiding pressure points, for example. Moreover, this geometry particularly promotes allowing the metatarsal and phalangeal bone structures to be guided in an anatomically efficient position through the stance phase, and for the moment arm between the ankle and the ground to be increased at toe-off. This geometry also reduces the braking forces attenuated at each MTP joint and can aid in injury prevention during the stance phase of the gait cycle during running.

To further promote these effects, the reinforcing members may curve in a smooth and continuous manner throughout the front half of the foot. For example, their geometry (as defined by their flow-lines, for example) may follow at least approximately an arc of a circle (possibly with different arcs/circles for different reinforcing members). This may allow a very smooth roll-off or stride during running, from heel to toe, namely a rolling movement, because a circle is a very efficient shape for movement and hence provides a very efficient movement path, as it rolls effortlessly.

Each of the reinforcing members can have a shape comprising a localized low point relative to a horizontal plane, wherein each of the low points is located in the front half of the sole.

The term "horizontal plane" is used to designate a plane parallel to a flat piece of ground in the state when the sole sits on this flat piece of ground and is not bent or twisted, i.e. in a force-free state.

For example, considering again the flow-lines of the reinforcing members defined above, according to the option discussed here each of these flow-line passes through a localized low point in the front half of the sole. "Localized" means that the low point is not an extended region but an identifiable point. In other words, on both sides of the low point, the reinforcing members move upwardly.

Each of the low points can be located in a region between the midfoot area and the toe area of the sole. More particularly, each of the low points can be located in the region of the MTP joints.

Having the low points of the reinforcing members correspond to the low point of the bone structure and anatomy of the foot again helps to provide adequate support to the foot and to create a stable structure to reduce overloading of the muscles and tendons during running.

Each of the low points can be located at a distance of at least 5 mm beneath a plane tangential to the upper side of the structure formed by the reinforcing members. In some embodiments, each of the low points can be located at a distance of at least 8 mm beneath a plane tangential to the upper side of the structure formed by the reinforcing members.

The distance from this (conceptual) plane describes the depth of the concave shape formed by the reinforcing members in the front half of the foot. This depth can be chosen according to a number of factors, for example the general size of the sole (generally, the larger the sole, the larger the depth). However, since the present disclosure uses individual reinforcing members, the depth of each individual reinforcing member can also be chosen and adapted independently, which may allow for a particularly fine-tuned control of the properties of the sole. The mentioned minimal values may provide for a sufficient depth, for example, to ensure a pleasant wearing sensation and to avoid fatigue. They may also allow the forefoot anatomy to settle into the reinforcing structure provided by the reinforcing members. The depth of the low points can also be adjusted according to the intended activity for which the sole and shoe are provided. For example, for an activity that requires or favors more stability, a larger depth may be chosen. The depth of the low points may further be adjusted to accommodate for a desired stack height of the midsole, e.g. if a thinner midsole is wanted then the depth of the low points can be chosen somewhat smaller.

The distance between the tangential plane and each of the low points can be the same, or at least approximately the same, to provide a constant roll-off behavior across the entire width of the sole, which may improve stability during roll-off and push-off and help to avoid injuries and fatigue in the forefoot joints, for example.

However, the distance between the tangential plane and each of the low points can also depend on the position of the respective low point relative to a lateral or a medial edge of the sole.

In other words, the depth of each low point can vary across the sole from the medial side towards the lateral side.

In one example, the depth of the low points on the medial and lateral edges of the sole can be smaller than in the middle of the sole, so that the reinforcing structure provided by the reinforcing members not only has a curvature in a side view of the sole and in the longitudinal direction, but there is also curvature in the medial-to-lateral direction.

In another example, the depth of the low points gradually increases from the medial side towards the lateral side. Such a construction may be advantageous as it may allow a greater external hip rotation angle, which can increase gluteal muscle activation through the last point of ground contact. It may thus redistribute positive work contribution up from the lower extremities, to enhance running efficiency. Such a shaping may also guide the forefoot slightly more into eversion, which may improve the activation of the hallux and allow the center of pressure to have a more linear translation in the direction of motion at toe-off.

To summarize, since it may be preferable that the low points align with the anatomical landmarks of the foot, e.g. the position of the MTP joints, as already mentioned above, and since these generally vary between person to person in location, depth, or both, the option of choosing the location and depth of each low point separately and independently provides for a large degree of customizability, which is very hard, if not impossible, to achieve using unitary stability structures as known from the art.

The section of each reinforcing member having the non-linear shape can extend at least from the midfoot area to the toe area of the sole.

The area from the toes to the midfoot is particularly important for toe-off or push-off of the foot, and it is therefore particularly supported by the reinforcing structure of the inventive sole. Avoiding straight lines, i.e. linear reinforcing members, in this area helps to promote a natural roll-off and push-off motion of the foot, while still providing the necessary stability and stiffness to allow less stress and fatigue on the lower extremities, and reducing the eccentric work done by an athlete.

The reinforcing members, or at least some of them, may also extend rearwardly beyond the midfoot area and into a heel area of the sole (see also the discussion of the second aspect of the present disclosure farther below for more details on this possibility).

In the heel area, the reinforcing members may also be curved and non-linear, or they may be straight, or at least straighter, since the rearfoot area usually does not undergo as much flexion as the midfoot and toe area. Using approximately straight sections for the reinforcing members here can therefore be beneficial, for example, by providing a high degree of stability during heel strike.

However, in some embodiments (e.g., depending on the intended field of use of the sole) it may also be preferred that the reinforcing members do not extend rearwardly beyond the projection of the calcaneus bone, because the heel may require more solid support as compared to the toes. In the heel area, there is mainly one bone in contact during the stance phase, namely the calcaneus, while during the transition to the forefoot area the bones generally act independently from each other. Therefore, while the individual reinforcing members supporting the midfoot and, in particular, the forefoot area are configured to move independently from one another, they may make room in the heel area for a more solid support structure, e.g. the load distribution member discussed further below.

The reinforcing members can be plate-like members.

In this context, "plate-like" may mean having a vertical thickness which is small compared to the longitudinal and transverse extension of the member. Plate-like reinforcing members can be beneficial as they provide a large surface area on which the foot may rest, thus providing a good stability frame to the foot.

The reinforcing members can also be rod-shaped or tube-shaped members.

Rod-shaped or tube-shaped members are, for example, members having an (approximately) circular, elliptic, prismatic, trapezoid, quadratic, or rectangular cross-section, wherein the cross-section is small compared to the longitudinal extension of the members. Rod-shaped members may be considered as generally solid members (i.e. predominately made up of solid sections), while tube-shaped members may be considered as generally hollow members (i.e. predominately made up of hollow sections).

Hybrid shapes lying between rod-shaped or tube-shaped and plate-like are also possible, and the cross-sectional shape may also change along a given reinforcing member (e.g., a given member may have a rod-shaped or tube-shaped section or sections and a plate-like section or sections). Moreover, not all of the reinforcing members within a given sole must be of the same type and shape, but mixtures are also possible.

As already indicated above, the reinforcing members can comprise solid sections, and the reinforcing members can also comprise hollow sections. Again, this may change along a given reinforcing member, and not all of the reinforcing members within a given sole must be of the same construction in this regard.

Using hollow sections, in particular for circular or elliptic tube-shaped reinforcing members, may allow providing a particularly low-weight construction while still providing the necessary degree of reinforcing (e.g., stiffening) of the sole.

Using solid sections, on the other hand, may, for example, allow to purposefully add weight to certain regions or sections of the sole, which may be used to balance out the sole and improve the sole's dynamic behavior during a gait cycle, when it undergoes multiple stages of accelerations in different directions.

The diameter of the reinforcing members can also vary between at least two of the reinforcing members and the diameter of at least one of the reinforcing members can vary along the reinforcing member.

In other words, the diameter is another parameter of the reinforcing members that can be changed and adapted to modify the dynamic behavior of the sole as wanted. Reinforcing members positioned at locations that are subject to higher forces during toe-off (e.g., beneath the first and the third toe and the corresponding metatarsals) can, for example, have a larger diameter to withstand such forces and provide high reinforcement specifically in these regions.

For circular cross-sections, the meaning of the diameter is clear. For other types of geometries for rod-shaped or tube-shaped members, the diameter can, for example, be the smallest (or alternatively the largest) distance across the cross-section of such a member. For example, for an elliptic cross section, the diameter can be the length of the minor (or alternatively the major) axis of the ellipse. For plate-like reinforcing members, the vertical thickness can be taken as a measure of their diameter.

Moreover, if the diameters of the concerned members vary along their extension, the above statements about the diameters may e.g. apply to an average diameter obtained by averaging the respective member's diameter over its longitudinal extension, or to the diameter of the respective members at a certain position within the sole (e.g., defined by a certain sectional plane through the sole).

For reinforcing members containing tube-shaped sections, additionally or alternatively to changing or varying their diameter, their wall thickness may also be modified and adjusted to influence their physical properties (e.g., their deformation and stiffness properties and their weight).

In some embodiments, there are five reinforcing members, each corresponding to a respective metatarsal bone. This may provide anatomical support during rolling from lateral to medial toe-off.

For example, the five reinforcing members can extend roughly beneath the metatarsal bones of the foot. However, they need not be precisely beneath these bones but can also be slightly shifted to one side (at least some of them). This may, for example, assist the center of mass of the sole being shifted over towards the big toe, provide for maximal push-off efficiency, and/or provide more natural flow-lines that better follow the general anatomy of the foot.

In this case, the reinforcing members corresponding to the first and the third metatarsal bone can have a higher deflection stiffness than the three remaining reinforcing members.

This may, for example, be achieved by the reinforcing members corresponding to the first and the third metatarsal bone having a larger diameter and/or larger wall thickness (if the reinforcing members are tube-shaped) than the three remaining reinforcing members.

An increased stiffness for the first metatarsal is beneficial as this is typically the largest and strongest structure of the five metatarsals in the foot, which hence has to exert and withstand the highest forces during running. The third metatarsal in the center of the foot, on the other hand, sits naturally around the center of pressure during the stance phase of the gait cycle during running, and hence also benefits from increased support.

To further foster the beneficial support provided by the present disclosure, the reinforcing member underneath the first metatarsal can also be extended to the edge of the midsole unit to increase the distance between the ankle joint and the toe-off location, increasing the moment arm in the anterior—posterior axis (i.e. the longitudinal axis). The reinforcing member underneath the first metatarsal can furthermore have a flattened or tapered tip in the area underneath the big toe to promote this effect even further.

The reinforcing members can comprise carbon fibers, a carbon fiber composite material, a glass fiber composite material, or any combination thereof. An example of a suitable carbon fiber composite material is, for instance, a polyamide material infused with carbon fibers. And an example of a suitable glass fiber composite material is, for instance, a polyamide material infused with glass fibers.

These materials may be preferred, because they provide high stability and stiffness while having a comparatively low weight.

However, other kinds of material for the reinforcing members like metal, wood, or injection-molded plastic materials are also possible and covered by the present disclosure.

In addition, the material composition may vary between the different reinforcing members or along a given reinforcing member, which may also facilitate imparting different physical properties to different reinforcing members or different sections of a given reinforcing member.

The reinforcing members may be manufactured using a number of manufacturing methods. Preferred options for such methods include, for example: molding (e.g. injection molding), additive manufacturing (e.g., 3D printing), or carbon extrusion.

More details on a manufacturing method according to an aspect of the present disclosure that allows for the manufacture of hollow, tube-shaped reinforcing members are given below.

At least two of the reinforcing members can further be connected by a connecting member.

This can help to provide some additional stability to the overall reinforcing structure provided by the reinforcing members, for example in the heel region where heel strike usually occurs. However, the connection provided by this connection member may be only supplemental in the sense that it does not impede, or at least not completely negate, the reinforcing members' ability to react and respond independently to the forces acting on them during a gait cycle, in particular not in the front half of the foot.

The connecting member may, for example, be arranged at, or close to, an end region of the reinforcing members. The connecting member may, for example, connect several or all of the reinforcing members close to their rearward end to improve the stability in this area (which may be the midfoot or heel area, for example, depending on the rearward extension of the reinforcing members.)

The connection may also be provided in the midfoot area, in particular in the area underneath the arch of the foot, because this is a very sensitive region of the foot that may need particular support, e.g. to prevent injuries or fatigue.

Another possibility is to have a connection between the two reinforcing members closest to the medial side of the sole (for example, the reinforcing members corresponding to the big toe and the second toe) and close to the front end of these two reinforcing members (e.g., in the area underneath the above-mentioned toes). By a suitable positioning and design of such a connection, some additional support for a stable push-off over these two toes can be provided. At the same time, the two connected reinforcing members may still be able to maintain a large degree of independency regarding their response to forces acting during the stages of the gait cycle preceding the actual push-off over the tips of the toes. In any case, by having only a pair of reinforcing members connected, the independency of motion of the remaining reinforcing members (if present) is not impaired.

The reinforcing members can extend substantially along the longitudinal direction of the sole.

Thus, the flow-lines of the reinforcing members can follow the natural flow-lines of the foot and the anatomy, and hence provide a particularly good support for reducing overloading on the lower extremities. Also, roll-off of the foot happens predominately along this direction, so that making the reinforcing members follow this direction also allows the natural roll-off movement to be taken into account by their shape and design.

The word "substantially" may be understood in this context as meaning that the deviation of the flow-lines of the reinforcing members from the longitudinal direction are small compared to the length of the reinforcing members. To give a specific example, for a reinforcing member that is 20 cm long, a deviation from the longitudinal direction (i.e., a lateral movement) of the flow-line of that member of up to 1 cm, or up to 2 cm or even up to 5 cm may still be considered to be a "substantially" longitudinal extension of the member.

The reinforcing members can be arranged next to each other in a medial-to-lateral direction.

This can help to provide a support frame on which the foot of the wearer can rest and is well supported, and may also be beneficial from a constructional point of view, as the thickness of the sole can be kept within an acceptable range, for example.

It also facilitates the option that the reinforcing members may be connected to a mesh-like material.

Such a mesh-like material can further increase the overall stability of the reinforcing structure provided by the reinforcing members, while still maintaining, at least to a large degree, their ability to deflect individually, i.e. to react and respond individually to the acting forces.

The reinforcing members may advantageously be further designed depending on and adapted to the need of the wearer, for example an athlete's running speed, running style and anatomy, as well as the distance of the run. Such customization may be related to changing the stiffness, length, material compositions, cross-sections, elasticity, plasticity, etc., of the individual reinforcing members as desired.

For example, by using a more plastic material for making the reinforcing members, it may be possible to customize their shape to the gait pattern of the runner, thereby adapting the structure of the midsole comprising the reinforcing members to the actual individual anatomical characteristics of the runner.

In another example, more elastic reinforcing members will retain their original shape and give a better energy return, facilitating the take-off phase in a smoother way, thereby reducing the load and stress at lower joints, specifically the MTP joints and the ankle joint.

The sole may furthermore comprise a load distribution member arranged in a back half of the sole, preferably in the heel area of the sole.

As the name says, such a load distribution member may serve to distribute the high forces occurring, e.g., during heel strike to a larger area of the foot and sole, to spare the runner's joints, improve the stability of heel strike, and avoid injuries and ankle twisting. More specifically, the load distribution member can help to distribute the forces occurring during impact from the lower extremities into the shoe sole from the calcaneus bone. This may prevent all the forces being distributed directly underneath the origin of the plantar fascia. It may also facilitate the forces being distributed over the complete surface area of the calcaneus. To enhance this effect, the load distribution member can be slightly curved, rather than being completely flat, because this can allow the foot to sit in a more ergonomical manner on the load distribution member, and it may also allow medial/lateral forces to be absorbed by the load distribution member (due to its upward curvature) and from there being distributed into the midsole material.

The load distribution member may in particular comprise a load distribution plate, or be constructed as a load distribution plate, to provide a particular high degree of load distribution while keeping the weight down. The plate may be curved, for example upwardly curved at its edges, for the reasons already discussed immediately above.

For example, a load distribution member in the form of a heel plate may help to ensure the stability of the ankle joint at ground-reaction when the foot strikes during running, which in turn may help to reduce overloading at the ankle.

To save weight, the load distribution member may also comprise carbon fibers, a carbon fiber composite material, a glass fiber composite material or any combination thereof. An example of a suitable carbon fiber composite material is for instance a polyamide material infused with carbon fibers.

And an example of a suitable glass fiber composite material is, for instance, a polyamide material infused with glass fibers. As already mentioned, these materials offer a particularly beneficial combination of high stability and stiffness and low weight.

The load distribution member may also extend further up the sole and into the midfoot area of the sole.

The load distribution member may hence also help to support the arch of the foot, which is a particularly sensitive region of the foot, and distribute the forces and pressure loads acting there, to avoid fatigue and injury and to facilitate a pleasant wearing sensation and good overall stability of the sole.

The reinforcing members and the load distribution member can also at least partially overlap.

In this context, the term "overlap" refers to a vertical projection or top view of the sole. If viewed from such a perspective, parts of the reinforcing members lie below or above the load distribution member. The term "overlap" does not imply that the reinforcing members and the load distribution member need to be in contact with one another or even be connected to each other, although this is generally also possible.

On the one hand, this overlap may provide a degree of interlock between the back half and the front half of the foot, again contributing to a high overall stability and the desired reinforcement to facilitate dynamic running movements. In other words, even though the reinforcing members and the load distribution member need not necessarily be physically connected, the overlap may have the effect that the load distribution member, once loaded, transfers the forces evenly to the reinforcing members (e.g., by way of the intermediate midsole material), helping to maintain adequate longitudinal support and also to create a high level of stability in the midfoot area, which is linked to reduce the risk of injury, for example caused by twisting of the feet. If an even stronger transmission of forces is required, the reinforcing members and the load distribution member may also be physically connected, e.g. by one or more connectors or connecting wings or flaps.

On the other hand, the overlap may also help the foot transition from the heel plate in the heel region towards the reinforcing members in the forefoot region and may hence lead to a comfortable fit in the arch region.

In some embodiments (e.g., depending on the intended field of application of the sole or shoe), it may be preferred that the reinforcing members and the load distribution member are independent elements, even though a physical connection is in principle also possible, as already explained above.

While this may decrease the interlock mentioned above, it helps to maintain the independency of the individual reinforcing members to react and respond to the acting forces, which has already been discussed as one beneficial feature of the present disclosure above.

Alternatively or in addition to a load distribution member arranged in a back half of the sole, the sole may also comprise a forefoot support plate arranged in a front half of the foot, preferably in the toe area of the sole.

The forefoot support plate may be curved, for example upwardly curved at its edges.

It may comprise carbon fibers, a carbon fiber composite material, a glass fiber composite material, or any combination thereof. An example of a suitable carbon fiber composite material is, for instance, a polyamide material infused with carbon fibers. And an example of a suitable glass fiber composite material is, for instance, a polyamide material infused with glass fibers. These materials offer a particularly beneficial combination of high stability and stiffness and low weight.

The forefoot support plate may also extend further up the sole and into the midfoot area of the sole, particularly into the arch region, and the reinforcing members and the forefoot support plate can also at least partially overlap.

The forefoot support plate can, in particular, be provided as a bottom plate, forming part of an outsole or ground contacting surface of the sole and being arranged underneath the reinforcing members, and it can, for example, provide sockets for cleats or spikes to be mounted on.

The forefoot support plate can be connected to one or more of the reinforcing members by means of one or more connectors or wings. For example, the two reinforcing members at the medial and lateral edge of the sole can be connected to the forefoot support plate, or four of five reinforcing members can be connected to the forefoot support plate.

Between the forefoot support plate and the reinforcing members, there can be a foam layer or cushioning layer (or several such layers of different materials), as will now be discussed.

The reinforcing members can be at least partially embedded within a midsole of the sole. The midsole may further comprise a plastic foam material. The reinforcing members can also be completely embedded within the midsole.

Embedding (partly or entirely) the reinforcing members within a midsole, in particular a foam midsole, provides a number of benefits:

First, by embedding the reinforcing member, additional fastening means or constructions might be unnecessary and even a bonding agent or glue may not have to be used, as the reinforcing members are simply held in position by the surrounding midsole material. This facilitates manufacture and makes the entire sole more environmentally friendly. The more the reinforcing members are surrounded by the midsole material, the better generally their fixation, i.e. if the reinforcing members are completely embedded within the midsole, their fixation by means of the midsole material is generally best. However, in some embodiments, bonding agents or glue may be used to fasten the reinforcing member within the midsole.

Second, by at least partially embedding the reinforcing members within the midsole, they may be kept from direct contact both with the feet of the wearer and with the ground. The former may be unpleasant and uncomfortable, while the latter may decrease traction and cause slipping of the sole when treading, for example, on a root or a stone, due to the comparative rigidity of the reinforcing members. From this point of view, exposing some sections of the reinforcing members at the sidewalls of the sole, for example, may be acceptable, while exposing the reinforcing members at the top or bottom side of the sole may not be desirable. However, it is also possible to reveal the reinforcing members at least partly from the top or bottom side of the sole, if needed for aesthetic, technical or fitting reasons.

Using a foam material for the midsole helps to keep the weight of the sole down, while at the same time providing good cushioning and shock absorbing properties.

The midsole may comprise a particle foam. The midsole may, in particular, comprise a particle foam that comprises particles of one or more of the following materials: expanded thermoplastic polyurethane (eTPU), expanded polyamide (ePA), expanded polyether-block-amide (ePEBA), expanded thermoplastic polyester ether elastomer (eTPEE).

These materials are particularly suited for performance footwear like running shoes, as they have a comparatively low weight, a high life span, good temperature stability (i.e., they keep their cushioning and energy returning properties over a large temperature range) and high cushioning and energy return to the runner. Particularly regarding the option of using an ePEBA particle foam, a specific advantage of such a particle foam is that it achieves similar performance level of other particle foams for a lower weight.

Alternatively or in addition the following materials can also be used, individually or in combination, for the particles of the particle foam midsole: expanded polylactide (ePLA), expanded polyethylene terephthalate (ePET), expanded polybutylene terephthalate (ePBT), and expanded thermoplastic olefin (eTPO).

The midsole may also comprise, alternatively or in addition to a particle foam material, a homogeneous foam material.

Examples of such materials are ethylene-vinyl-acetate (EVA), injection-molded TPU, TPEE or other suitable materials. Such materials may be used because they are cheaper and/or easier to process in certain regards than particle foams. For example, with injection molding where a liquid material is injected into a molding cavity under high pressure, it may be easier to obtain an even distribution of the midsole material around the reinforcing members than using a particulate base material which might get stuck.

Once again, particle foams and homogeneous foam materials may also be combined in the midsole, and, in particular, different materials may be used in different places and/or layers in the midsole, to provide different properties to the respective regions/layers.

Alternatively or in addition to using a foam material for the midsole, other materials and manufacturing options may also be used, and what has been said above about embedding the reinforcing members within a foam midsole may also apply, as far as physically and technically feasible, to such other midsole options. For example, the midsole may comprise or be comprised of a lattice structure, for example an additively manufactured lattice structure (e.g., a structure made using a 3D printing method or a laser sintering method or a stereolithography method), which may be tailored both for long distance running shoes, where a high cushioning is preferred, and for sprint spikes or lower distance running shoes where the high cushioning is not a necessity, but high stiffness and anatomical guidance of the foot during ground contact is beneficial.

The midsole can comprise a lower midsole part and an upper midsole part, wherein the reinforcing members are positioned between the lower midsole part and the upper midsole part.

This can facilitate assembly of the sole, in that the upper and lower part can first be separately manufactured, and then the reinforcing members be arranged between the two. This may, for example, be relevant when particle foams are used, as it may not always be easy to achieve an even distribution of the particles around the reinforcing members during manufacture, in particular if the reinforcing members are dense within the midsole and do not provide sufficient openings for the particles to pass through during mold loading. By individually manufacturing the upper and lower midsole part, such problems can be avoided. Such an approach can, however, also be beneficial if other material and/or manufacturing options for the midsole are used, for example, the lattice structures mentioned above.

Moreover, using separate upper and lower parts can also be used to provide the different parts of the midsole with different physical and performance properties. For example, the lower part can be made more wear resistant and stable, while the upper part can be specifically geared towards cushioning and shock absorption, to name just one possible example.

This construction with an upper and lower midsole part can also be used to further advantage in that the reinforcing members and the load distribution member can be separated by the upper midsole part (and analogously, if desired, for the forefoot support plate and, e.g., the lower midsole part).

For example, the upper midsole part can be generally arranged on top of the reinforcing members and the load distribution member can then be put on top or be partially or fully embedded in a top side of the upper midsole part. As mentioned above, it may for certain applications be preferable that the reinforcing members and the load distribution member are kept separate elements while still providing some degree of functional interlock, and by using the upper midsole part as an intermediate element both demands can be beneficially balanced against each other.

To repeat this once again, the load distribution member can be at least partially embedded within the upper midsole part.

However, it is once again emphasized that the functional interlock between the reinforcing members and the load distribution member/forefoot support plate can also be achieved in other ways, for example, the load distribution member/forefoot support plate may have portions extending into the spaces between and/or connecting to some or all of the reinforcing members.

Apart from the functional interlock with the reinforcing members mentioned above, embedding the load distribution member within the upper midsole part can also help to keep the load distribution member in place, and also to keep it from direct contact with the runner's foot or at least from sticking out of the sole (again, similar statements also apply to the forefoot support plate and the lower midsole part).

It is mentioned that in all of these constructions, however, the reinforcing members may retain their ability to be independently movable with respect to the other reinforcing members, thereby being able to adhere to the anatomical and biomechanical characteristics of the feet of an individual wearer.

Alternatively or in addition to embedding the load distribution member (partly or fully) within the upper midsole part, the sole can also comprise a sock-liner.

The sock-liner can be arranged on top of the upper midsole part and at least partially cover the load distribution member, to achieve the benefits mentioned directly above, if this is not already done by embedding the load distribution member in the upper midsole part.

It is also emphasized that a sock-liner may also be used in an inventive sole which does not have a load distribution member. The sock-liner can also more generally serve the purpose of an upper midsole part, for example to reduce the manufacturing complexity connected to embedding the reinforcing members within the midsole. The reinforcing members can, for example, be placed in a lower midsole shell and then the sock-liner is simply added on top to act as a lid, to cover and contain the reinforcing members inside the sole. Another benefit of using a sock-liner may be to allow for the thickness of the upper midsole part or midsole to be reduced, and, to compensate for the loss of cushioning, a high sock-liner can then be included which has good cushioning properties (for example, a sock-liner using an eTPU particle foam). In other words, the sock-liner can provide a further degree of cushioning to the sole. Or it can provide a further degree of stability to the sole. Yet another option is that the sock-liner may simply be desirable in order to have replaceable elements in a pair of shoes, for example if the shoes get wet by rain or sweat, when the sock-liners can be replaced by a dry pair without having to change the entire pair of shoes. A sock-liner may further help to reduce the eccentric forces and muscle damage after a long usage, for example, after a long run.

The sole can further comprise an outsole.

This may help to increase traction and also provide improved wear resistance and hence a longer life-span for the sole and the shoe.

While the possible features, options and modifications pertaining to a sole according to some embodiments have been described in a specific order above, it is emphasized that this is not done to express a certain dependency between the described features and options (unless stated otherwise). Rather, the different features and options can be combined among each other also in different orders and permutations—as far as physically and technically feasible—and such combinations of features or even sub-features are also covered by the present disclosure. Individual features or sub-features described above may be omitted, if they are not necessary to obtain the desired technical result.

To briefly summarize and further expand on the aspects, embodiments and options of the present disclosure discussed so far, the present disclosure provides, in particular, for a lightweight reinforcing structure with rod-shaped or tube-shaped members that may help to eliminate supportive material in a shoe sole where it may not be necessary, and to open areas where a different effect on footwear bottom units or uppers may be desirable. By using different compounds for the hollow or solid, i.e. tube- or rod-shaped members, these members can be used depending on the deformation and reactiveness of the used material to enhance the propulsion or shock absorption of the sole.

The lightweight, hollow or solid, i.e. tube- or rod-shaped members can also be tuned in size and profile, and by changing the orientation of the profiles and the width of the members they are very adjustable for different needs in soles and shoes. They can be engineered as very stiff to very flexible by changing their geometries and using soft to hard materials, to create a system of applications. The visual of the reinforcing structure thus created also supports its meaning and it hence becomes unique and intuitively understandable for the customer. The present disclosure helps, for instance, to look into torsionability, heel impact, shock absorption, forefoot propulsion, guidance along the center of pressure, banking, heel-upper support, ankle/midfoot support and lock down, and it could become or provide for a new suspension/cushioning technology in different categories, like suspension stud technology for football or cleated shoes.

Adding additional flexible or elastic fibers/textiles/compounds to an inventive reinforcing structure with tube-shaped or rod-shaped members also offers the possibility to create a trampoline effect in a shoe, which may be employed to provide new kinds of midsole-upper constructions, e.g. once more flexible materials are used for the tube-shaped or rod-shaped members.

A second aspect of the present disclosure also relates to a sole for a shoe.

Again, the sole can be used in a running shoe. However, the sole can also be used in different kinds of shoes, in particular other kinds of sports shoes, and its use is not limited to running shoes. For example, the sole can be used in shoes for track-and-fields, shoes for long jump, shoes for sprinting or short distance track races, shoes for hurdle races, shoes for mid- or long-distance track races, and so on. The sole can also be used in non-sports shoes.

Moreover, it is emphasized that all options, modifications and embodiments discussed herein in relation to the first aspect of the present disclosure may also be used within the context of, and be combined with, any and all embodiments of this second aspect of the disclosure (as far as technically and physically possible)—and vice versa—even if not explicitly discussed. For the reasons of conciseness, only a few selected such options and combinations are therefore mentioned and described in some more detail below, to provide a better understanding of the scope of the present disclosure. With regard to the corresponding technical advantages, we refer to the statements above which also apply in the context of the second aspect of the present disclosure.

In an embodiment, the sole according to this second aspect comprises at least two reinforcing members extending in a front half of the sole, wherein at least a first one of the reinforcing members (called "the first reinforcing member" in the following) further extends rearwardly beyond the midfoot area and into a heel area of the sole and wraps up to a posterior portion of the ankle region.

Preferably, also a second one of the reinforcing members (called "the second reinforcing member" in the following) further extends rearwardly beyond the midfoot area and into the heel area of the sole and wraps up to the posterior portion of the ankle region.

This second aspect of the present disclosure particularly provides for the option of providing a reinforcing structure with hollow and/or solid, i.e. tube- and/or rod-shaped reinforcing members, which may be manufactured from, e.g., carbon fiber composite material or carbon infused polyamide material, and which can be located in the midsole of a shoe directly underneath the metatarsal bones, stretching back to the rearfoot and wrapping up to the posterior portion of the ankle/calcaneus region, thus providing a homogeneous stiffness which can create an optimized ankle-lever in fast running.

One key function of such a reinforcing structure according to some embodiments is to increase the longitudinal bending stiffness of the entire shoe and to allow a biomechanically preferred movement of the foot, ankle and surrounding sub-structures during the stance phase of the gate cycle when running. The reinforcing members may be of similar stiffness but non-equal geometry, with a tunable diameter/wall thickness, and they may be hollow or solid, or have such sections, as already mentioned. The reinforcing member underneath the first metatarsal may be extended to the edge of the midsole unit to increase the distance between the ankle joint and the toe-off location, increasing the moment arm in the anterior—posterior axis.

The reinforcing structure may further curve in a smooth and continuous manner, i.e. its geometry (as, e.g., defined by the flow-lines of the reinforcing members) may follow at least approximately an arc of a circle, from rearfoot to underneath the metatarsal heads, allowing for adequate support and guidance of the foot and the surrounding sub-structures. This geometry may also reduce the braking forces attenuated at the metatarsophalangeal joint and reduce the overall work done at this joint, during the stance phase of the gait cycle during running. Thus, such a geometry may allow the metatarsal and phalangeal bone structures to be guided in an anatomically efficient position through the stance phase and also allow for the moment arm between the ankle and the ground to be increased at toe-off.

The improvements thus made by the present disclosure could also translate to improved longevity of the athletes, with a reduced recovery time and lower injury risk/rate.

Another advantage of the provided reinforcing structure is its reduced weight, and therefore weight reduction of the entire product compared to older models. Another advantage is the simplicity of shoe construction and stock fitting to the midsole compared to known techniques and constructions. Another advantage is the possibility to provide a homogenous stiffness from the ankle/calcaneus region to the toe-off region, which was not as homogenous on known structures.

Also with this second aspect, the reinforcing members may be configured to be independently deflected by forces acting on the sole during a gait cycle, in particular in the front half of the sole.

The first reinforcing member can in particular be a medial reinforcing member and the second reinforcing member a lateral reinforcing member.

The first reinforcing member and the second reinforcing member can be joined together, in particular behind the heel.

The first reinforcing member can further comprise a flattened tip extending into a region underneath the first metatarsophalangeal head/big toe.

The reinforcing members can be rod-shaped and/or tube-shaped members. They can consist of or comprise solid and/or hollow sections.

A diameter of the reinforcing members can vary between at least two of the reinforcing members and/or a diameter of at least one of the reinforcing members can vary along said reinforcing member.

Alternatively or in addition, in the case some or all of the reinforcing members comprise hollow sections, a wall thickness of the hollow sections can vary between at least two of the reinforcing members and/or along one or more of the reinforcing members.

There can, in particular, be five reinforcing members, each corresponding to a respective metatarsal bone, wherein preferably the first reinforcing member corresponds to the first metatarsal bone/big toe.

The reinforcing members corresponding to the first and the third metatarsal bone can have a higher deflection stiffness than the three remaining reinforcing members. The reinforcing members corresponding to the first and the third metatarsal bone can have a larger diameter and/or larger wall thickness than the three remaining reinforcing members.

A third aspect of the present disclosure is provided by a shoe, in particular a running shoe, comprising a sole according to one of the options and embodiments of the first and/or second aspect described above or described further below in the present document. As already mentioned in the beginning, though, the sole of the present disclosure may also be used in different kinds of shoes, in particular other kinds of sports shoes, for example in shoes for track-and-fields, shoes for long jump, shoes for sprinting or short distance track races, shoes for hurdle races, or shoes for mid- or long-distance track races. The sole can also be used in non-sports shoes.

A fourth aspect of the present disclosure is provided by a method for the manufacture of a reinforcing structure or part of a reinforcing structure for a shoe sole with at least one reinforcing member with a hollow section.

In an embodiment, the method comprises the steps of (a.) injecting a liquid molding material into a molding cavity of a mold, the molding cavity having a shape corresponding to the outer dimensions of the reinforcing member with the hollow section, and (b.) injecting a displacement gas into the molding cavity under pressure, wherein (c.) during steps (a.) and (b.) an exit path connecting the molding cavity to an outlet well is closed. The method further comprises step (d.) of opening the exit path to release the pressurized displacement gas and remove the liquid molding material from the center of the molding cavity to form the hollow section.

The method can be used in the manufacture of a sole according to any option or embodiment of the first and/or second aspect of the present disclosure, and of a shoe according to an embodiment of the third aspect of the present disclosure.

BRIEF DESCRIPTION OF THE FIGURES

Possible embodiments of the present disclosure are described in more detail below with reference to the following figures.

DETAILED DESCRIPTION

Possible embodiments of the different aspects of the present disclosure are described below, predominately with respect to running shoes. It is, however, emphasized once again that the different aspects of the present disclosure may also be practiced in different kinds of shoes and are not limited to the specific embodiments set forth below.

Reference is further made to the fact that in the following paragraphs, various embodiments of the present disclosure are described in more detail. A person of ordinary skill in the art will understand, however, that the features and possible modifications described with reference to these specific embodiments may also be further modified and/or combined with one another in a different manner or in different sub-combinations, without departing from the scope of the present disclosure. Individual features or sub-features may also be omitted, if they are dispensable to obtain the desired result. In order to avoid redundancies, reference is therefore made to the explanations in the preceding sections, which also apply to the following detailed description.

FIGS. 1a-f show an embodiment of a sole 100, or parts thereof, according to the present disclosure, from different view angles.

Figure 1A:
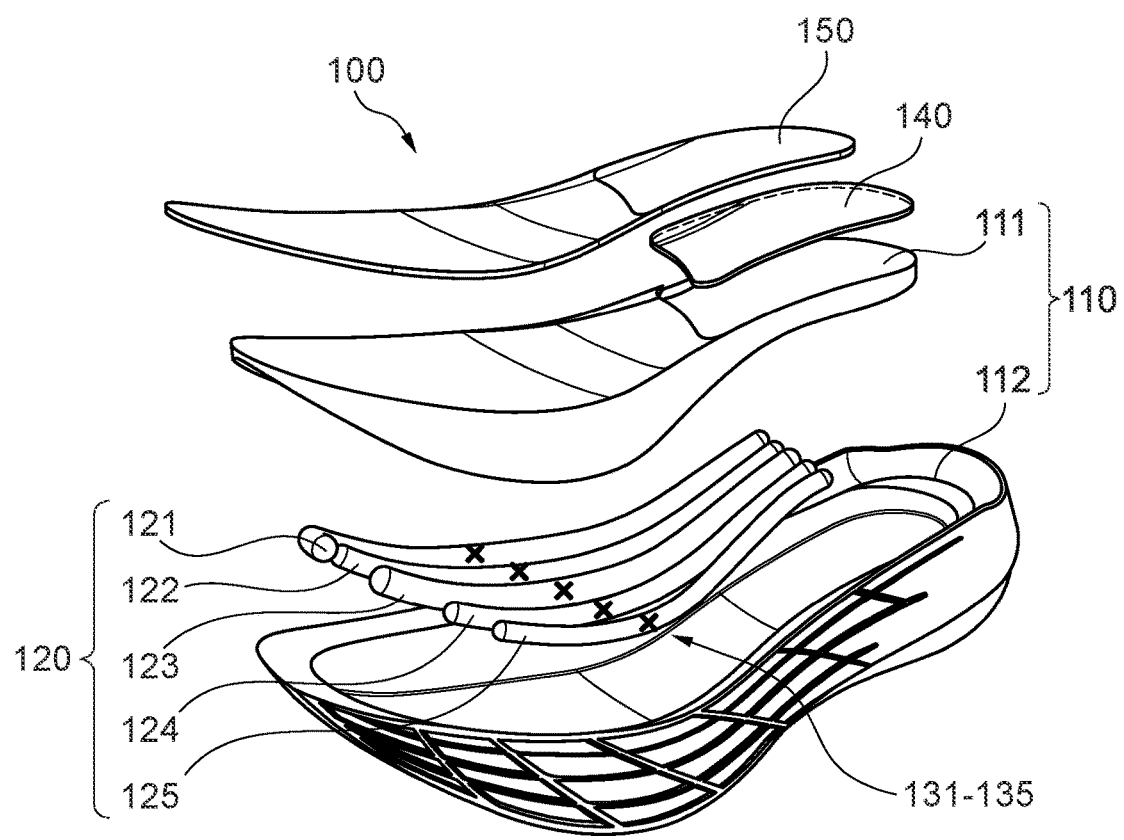
FIG. 1a shows an exploded isometric view of a sole with reinforcing members and a load distribution member according to some embodiments.

FIG. 1a shows an exploded view of the entire sole 100. The sole 100 comprises a midsole 110 with an upper midsole part 111 and a lower midsole part 112. Fully embedded between the upper midsole part 111 and the lower midsole part 112 is a reinforcing structure 120 comprising five reinforcing members, individually referenced by reference numerals 121-125 in FIG. 1a. The sole 100 further comprises a load distribution member 140 partially embedded within the top side of the upper midsole part 111. The upper midsole part 111 thus separates the reinforcing members 121-125 from the load distribution member 140, i.e., the reinforcing members 121-125 on the one hand and the load distribution member 140 on the other hand are provided as separate and individual elements. The load distribution member 140 and the upper midsole part 111 are further covered by a sock-liner 150, which may be replaceable or permanently connected to the load distribution member 140 and the upper midsole part 111. In other embodiments, the sock-liner 150 may also be absent. The sole 100 may also comprise an outsole (not shown in FIG. 1a), to improve traction and wear resistance. The sole 100 may also be fitted with cleats and/or spikes, to make it suitable for track-and-field activities, for example.

The sole 100 may be used in a sports shoe, in particular in a running shoe.

The upper and lower midsole parts 111, 112 may comprise or be made of a plastic foam material. The upper and lower midsole parts 111, 112 can comprise or be made of the same material, or they can comprise or be made of different materials. It is also possible that within a given midsole part, the material composition changes locally, i.e., that different materials are used in different regions, e.g., to locally influence the mechanical properties of the upper and/or lower midsole part 111, 112. The plastic foam material can comprise a homogeneous foam material, like ethylene-vinyl-acetate (EVA) or injection-molded thermoplastic polyurethane (TPU), or thermoplastic polyester ether elastomer (TPEE), or other suitable materials. The plastic foam material can also comprise a particle foam. For example, particle foams made of or comprising particles of expanded thermoplastic polyurethane (eTPU), expanded polyamide (ePA), expanded polyether-block-amide (ePEBA) and/or expanded thermoplastic polyester ether elastomer (eTPEE) are particularly well suited for use in performance footwear, because they provide a high degree of cushioning and energy return back to the wearer. For example, particle foams of eTPU maintain their beneficial properties over a large temperature range (e.g., from −20° C. up to 40° C.). Particle foams including particles of expanded polylactide (ePLA), expanded polyethylene terephthalate (ePET), expanded thermoplastic olefin (eTPO) and/or expanded polybutylene terephthalate (ePBT) are also possible. To give one specific example, the lower midsole part 112 may be made from a homogeneous EVA- or TPU- or TPEE-foam material, to provide good overall stability and wear resistance to the sole 100, while the upper midsole part 111 may be made from a particle foam comprising particles of eTPU, ePA, ePEBA, eTPEE, or any combination thereof, to provide good cushioning, high energy return, and a smoother transition which reduce eccentric forces and give a comfortable ride.

It is emphasized, however, that alternatively or in addition to using a foam material for the midsole 110, other materials and manufacturing options may also be used. For example, the midsole 110 or parts thereof may comprise or be comprised of a lattice structure, for example an additively manufactured lattice structure (e.g., a structure made using a 3D printing method or a laser sintering method or a stereolithography method), which, as already mentioned above, may be useful both for long distance running shoes, where a high cushioning is preferred, and for sprint spikes or lower distance running shoes where high cushioning is not a necessity, but high stiffness and anatomical guidance of the foot during ground contact is beneficial.

Moreover, it is also emphasized that the present disclosure also covers embodiments wherein the sole does not comprise separate upper- and lower midsole parts, but only one unified midsole component. Such a midsole may also comprise or be made of one or more of the above-mentioned homogeneous foam materials and/or particle foams and/or non-foamed materials like a lattice structure as mentioned above, for example.

The load distribution member 140 is located in the back half of the sole 100, predominately in the heel area of the sole 100, where heel strike occurs. It also extends some distance towards the center of the sole 100, e.g. the midfoot area, such that in a vertical projection of the sole 100 the load distribution member 140 overlaps partly with the reinforcing structure 120 provided by the five reinforcing members 121-125 (more details on this below). The load distribution member 140 is provided as a substantially planar load distribution plate in the embodiment shown here, but other geometries like a slight bowl-shape or cup-shape, potentially including a heel counter, are also possible. To save weight but still provide the desired degree of load distribution, the load distribution member 140 may, for example, comprise or be made of carbon fibers, a carbon fiber composite material, and/or a glass fiber composite material, such as, for instance, a polyamide material infused with carbon fibers and/or a polyamide material infused with glass fibers.

Turning to the exemplary embodiment of the reinforcing structure 120 provided by the five reinforcing members 121-125, the reinforcing members 121-125 extend in the front half of the sole 100. More specifically, the reinforcing members 121-125 extend from the midfoot area—here the area under the arch of the foot—up to the toes. The reinforcing members 121-125 extend substantially longitudinally through the sole 100, i.e. their longitudinal (i.e., from the back of the sole 100 to the front) extension is much larger than their lateral and medial extension along their course through the sole 100. The reinforcing members 121-125 are further arranged next to each other in the medial-to-lateral direction, starting with the reinforcing member 121 on the medial side of the sole 100 and continuing up to the reinforcing member 125 on the lateral side of the sole 100. The reinforcing members 121-125 of the embodiment shown here are of circular cross-section, and their central symmetry axis defines what is called their "flow-lines" in the present document. Other cross-sectional shapes are, however, also covered by the present disclosure. Examples of further possible cross-sectional shapes include elliptic, prismatic, trapezoid, quadratic, or rectangular cross-sections.

As mentioned above, the reinforcing members 121-125 are positioned between the upper and lower midsole part 111, 112 and may be completely embedded within the midsole 110. If necessary or deemed beneficial, the reinforcing members 121-125 may be connected to the material of the midsole 110 by a bonding agent or glue, for example, or by some mechanical fastening means. However, since they are completely embedded within the material of the midsole 110, this may not be necessary. In other embodiments, the reinforcing members 121-125 may also partly protrude from the midsole material and be exposed on the outside of the sole 100, for example at the medial or lateral sidewall. It is, however, generally preferable that the reinforcing members 121-125 are not exposed on the top side and the bottom side of the sole 100, to not impair the wearing sensation and traction of the sole, respectively.

The reinforcing members 121-125 are configured to move independently from each other under the forces acting during a gait cycle. In particular, the reinforcing members 121-125 are configured to be deflected independently from one another by the forces acting during a gait cycle, and hence provide a locally fine-tuned support and reinforcing function that cannot be achieved by a simple unitary structure known from the art, for example. The reinforcing members 121-125 thus cater to the complicated anatomy of the human foot and the complex movement patterns involved in running or sprinting motions, by allowing different regions of the sole 100, in particular in the front half and the toe region of the sole 100, to be supported and reinforced to different degrees. This provides a more biomechanically-driven solution than are known from the art. The reinforcing members 121-125 help to provide a smoother landing of the foot and a smooth transition, thereby reducing the eccentric forces and reducing overloading of muscle, bones, and joints. This helps to lower the overall risk of injuries during sports.

The reinforcing members 121-125 are non-linear, i.e. their flow-lines do not follow a straight line, in order to further cater to the human anatomy. In the embodiment shown here, the reinforcing members 121-125 do not even comprise straight sections, although this is generally possible within the scope of the present disclosure. As can best be seen in the medial side views of FIGS. 1d and 1e, the reinforcing members 121-125 form a concave structure (e.g., a structure in the shape of a bowl or saucer) in the region between the midfoot area and the toes, corresponding to the general shape and anatomy of the foot. This shape also facilitates a smooth roll-off movement of the foot and hence promotes natural movement patterns.

Figure 1B:
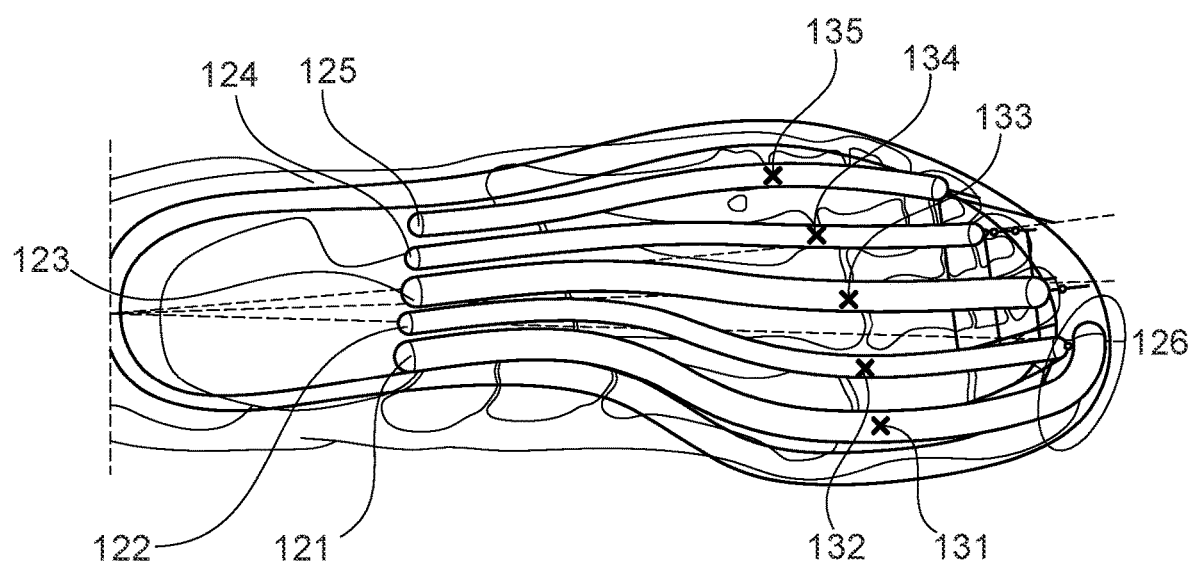
FIG. 1b shows a top down view of the reinforcing members overlaid onto an X-ray of a user's foot according to some embodiments.

Put into more mathematical language, the shape (e.g., as defined by the flow-line) of each of the reinforcing members 121-125 comprises a minimum or localized low point with regard to the horizontal plane. It is noted that this statement includes the assumption that the sole sits on a horizontal, flat piece of ground (if the sole is tilted, then the reference-plane must also be tilted in the same manner) and in a force-free state (i.e., without being bent or twisted). The position of these low points is indicated in FIGS. 1a and 1b by crosses for all five reinforcing members 121-125 and designated by the reference numerals 131-135. In the side view of FIGS. 1d and 1e, only two of these low points are shown, to not clutter up the figures too much. All of the low points 131-135 are located in the front half of the sole 100. More specifically, each of the low points is located between the midfoot area of the sole 100 and the toes, here in the region of the MTP joints. In other embodiments, the precise position may vary from the position shown here, for example to cater for the specific anatomy of a runner's feet, their running style and pattern of movement, and so forth. It is also emphasized that the position of the low points 131-135 is only generally indicated in FIGS. 1a, 1b, 1d and 1e (and also all subsequent figures of the present application), to illustrate the point at hand, and not determined with the highest precision (e.g., using a computer simulation).

As mentioned above, the reinforcing members 121-125 form a concave structure e.g., a structure in the shape of a bowl or saucer) in the region between the midfoot area and the toes. With regard to the low points 131-135 this means that these points sit a certain distance below the plane tangential to the upper side of the reinforcing structure 120 that is formed by the reinforcing members 121-125. A clear illustration of this concept is given by FIG. 3*b* (i.e., the plane 339 and the distance d), and reference is made to the discussion of that figure for more details and explanations. An illustrative way to think about this is to imagine that the reinforcing structure 120 is isolated from the sole 100 with its shape and structure kept intact, and then a sheet of cardboard or a thin metal plate is put on top of the structure. Then the (perpendicular) distance of the low points 131-135 from this plane is determined. The more bowl-shaped the reinforcing structure 120 is, the larger this distance will generally be.

To cater for the typical human anatomy, all of the low points 131-135 may be a distance of at least 5 mm below the above-defined tangential reference-plane, or even a distance of at least 8 mm. As mentioned above, the depth can also be adjusted according to the intended activity for which the sole and shoe are provided. For example, for an activity that requires or favors more stability, a larger depth may be chosen. However, as also already mentioned, if, e.g., a particularly thin midsole is wanted, then the depth can also be chosen smaller.

Alternatively or in addition to following a lower limit on the depth of the structure defined by the reinforcing members 121-125, the distance of the low points 131-135 to the mentioned tangential reference-plane may also be adjusted or changed depending on the position of the respective low point with regard to the medial-to-lateral direction. For example, the center point 133 may be the deepest, and then the distance to the reference-plane (i.e., the depth of the low points) decreases towards the lateral and medial edges, following the general anatomy of the human foot. Other configurations are, however, also possible, to take account of a specific anatomical feature or some individual movement pattern, for example.

The reinforcing members 121-125 can be solid (i.e., rod-shaped members) or they can be hollow (i.e., tube-shaped members), or they can be partly solid and partly hollow, depending on the desired trade-off between factors like weight, stability, stiffness, etc. Not all of the reinforcing members 121-125 have to be of the same construction in this regard.

Figure 1C:
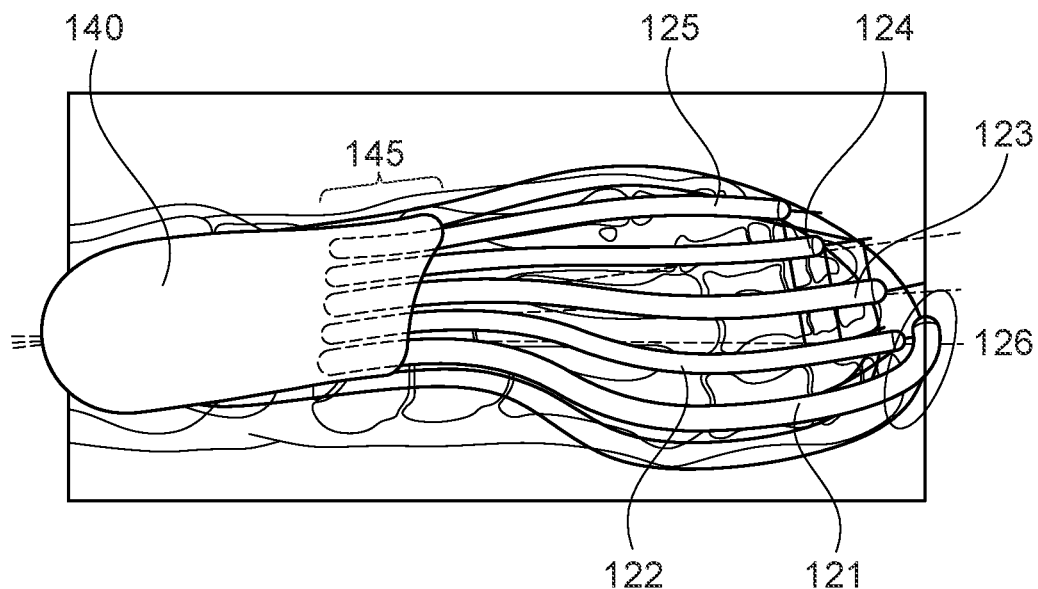
FIG. 1c shows a top down view of the reinforcing members and the load distribution member overlaid onto an X-ray of a user's foot according to some embodiments.

As can be seen in the vertical projection (or top view) of some of the components the sole 100 shown in FIGS. 1*b* and 1*c*, each of the reinforcing members 121-125 corresponds to one toe/one metatarsal bone of the foot. To make this more visible, the reinforcing structure 120 consisting of the reinforcing members 121-125 is overlaid in FIGS. 1*b* and 1*c* over a schematic view of an x-ray picture of a typical human foot. While it will be understood from this overlay view that the reinforcing members 121-125 do not always follow exactly each kink and turn of the human bone structure, the correspondence between the five reinforcing members 121-125 and the five metatarsal bones is still clearly visible. Each of the reinforcing members 121-125 will therefore be the predominate source of support for one of the toes of the foot. The reinforcing member 121 corresponds to the first metatarsal bone (i.e., the big toe), reinforcing member 122 corresponds to the second metatarsal bone, reinforcing member 123 corresponds to the third metatarsal bone, reinforcing member 124 corresponds to the fourth metatarsal bone, and reinforcing member 125 corresponds to the fifth metatarsal bone.

As can also be clearly seen in FIGS. 1*b* and 1*a* (but also in all of the other FIGS. 1*a-f* pertaining to the sole 100), the reinforcing members 121 and 123, corresponding to the first and third metatarsal bone, respectively, have a larger diameter than the remaining three reinforcing members 122, 124, and 125. The increased diameter leads to a higher deflection stiffness of the reinforcing members 121 and 123 compared to the other three reinforcing members 122, 124, and 125 under the forces acting during a gait cycle, and hence to an increased support of the first and third metatarsal bones and the first and third toe.

Alternatively or in addition to having different diameters, the reinforcing members 121 and 123 could also have a larger wall thickness than the reinforcing members 122, 124, and 125, if they are provided tube-like or at least have hollow sections.

The reinforcing member 121 furthermore has an extended front section 126 which preferably curves in under the tip of the big toe, to provide even better support in this region. One reason for this specific shape and design of the reinforcing members 121 and 123 is that an increased stiffness for the first metatarsal is beneficial as this is typically the largest and strongest structure of the five metatarsals in the foot, which hence has to exert and withstand the highest forces during running. The third metatarsal in the center of the foot, on the other hand, sits naturally around the center of pressure during the stance phase of the gait cycle during running, and hence also benefits from increased support. This further helps the load to get biomechanically driven and evenly distributed between the different MTP bones. This will reduce the risk of injuries.

Figure 1D:
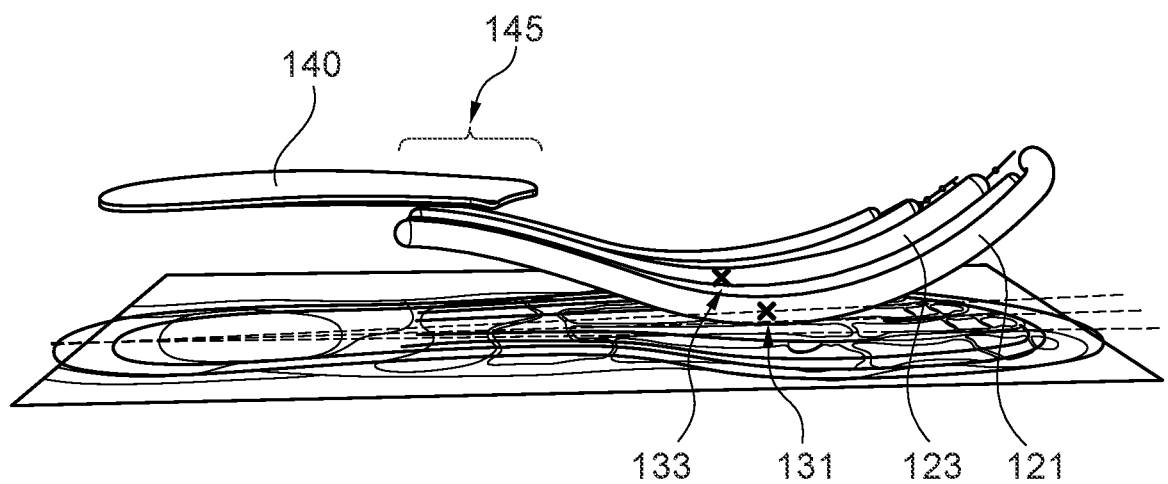
FIG. 1d shows a side view of the reinforcing members and the load distribution member according to some embodiments.
Figure 1E:
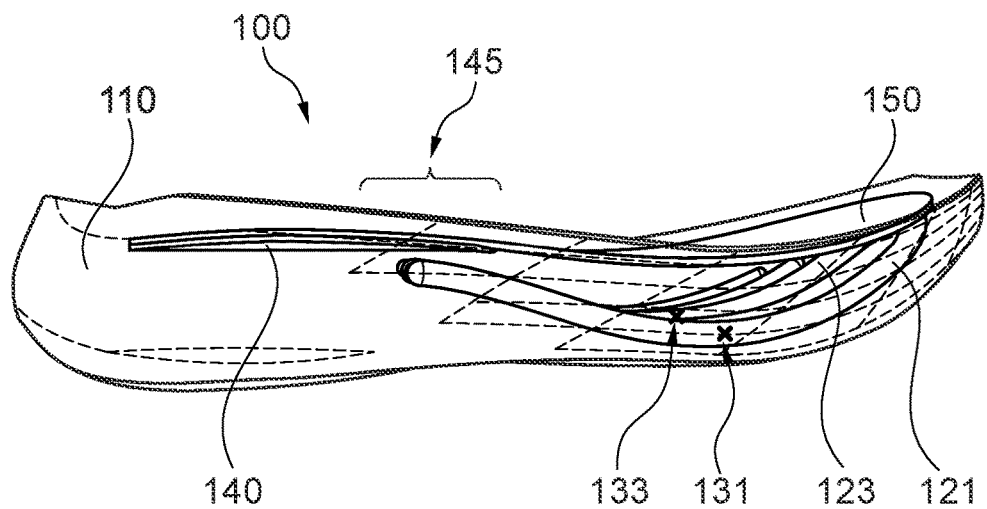
FIG. 1e shows a side view of the reinforcing members and the load distribution member within a midsole according to some embodiments.
Figure 1F:
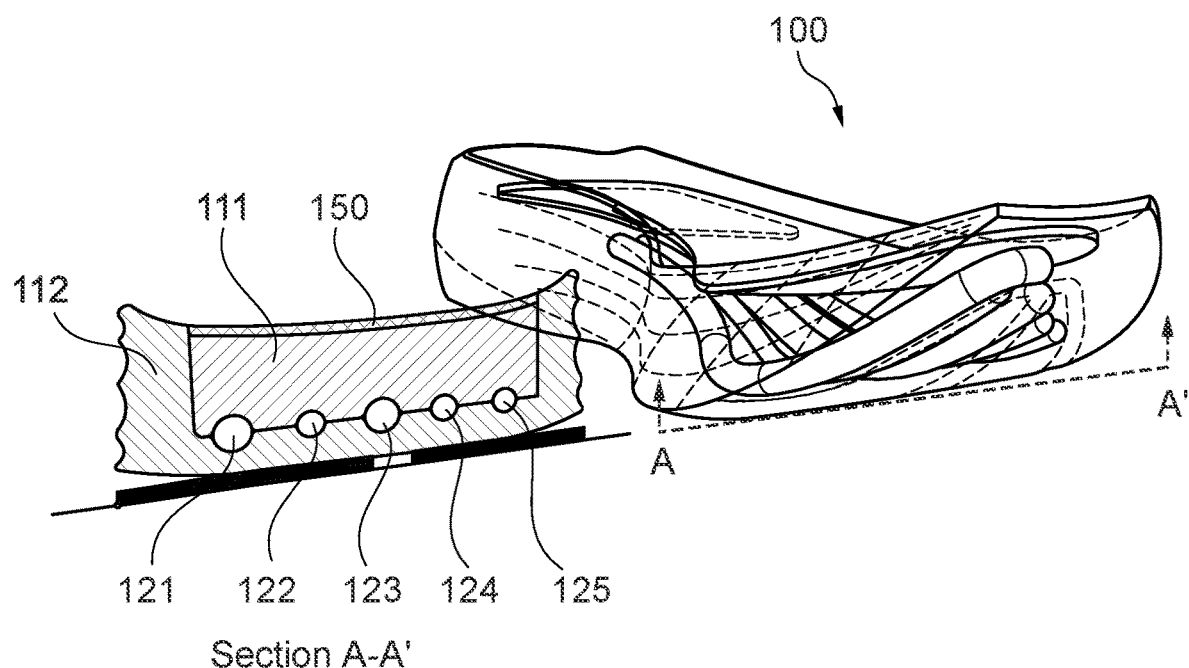
FIG. 1f shows a front isometric view of the reinforcing members and the sole of the embodiment within a midsole according to some embodiments.

The different diameters of the reinforcing members 121 and 123 compared to the reinforcing members 122, 124, and 125 is also visible in FIG. 1*f*, which shows in the left half of the figure a cross-section through the sole 100 from the medial to the lateral side in the region under the MTP joints. FIG. 1*f* also once again nicely shows how the five reinforcing members 121-125 are embedded between the upper midsole part 111 and the lower midsole part 112.

More generally speaking, it is mentioned that the diameter and/or wall thickness (for hollow or partly hollow members) of the reinforcing members 121-125 may also be altered and adapted in a different manner between them, and the diameter and/or wall thickness also does not need to stay constant along a given reinforcing member, even if this is the case in the sole 100 shown in FIGS. 1*a-f*. By altering the diameter/wall thickness between the different reinforcing members and/or along a given reinforcing member, a fine-tuning to a specific set of requirements regarding the support and reinforcement provided by the reinforcing structure 120 can thus be obtained.

Further examples of shoe soles 900 and 1000*a-d* with different configurations of rod-shaped or tube-shaped reinforcing members are discussed below in relation to FIGS. 9*a-b* and 10*a-d*.

The reinforcing members 121-125 can comprise or be made of a large number of materials. However, to achieve a beneficial tradeoff between stiffness and reinforcement on the one hand, and low weight on the other hand, preferred materials for the construction of the reinforcing members 121-125 are carbon fibers, carbon fiber composite materials, and/or glass fibers composite materials, such as for instance, polyamide materials infused with carbon fibers and/or polyamide materials infused with glass fibers. Besides their good stiffness-to-weight ratio, they are also very adaptable when it comes to the kinds of geometries and shapes of reinforcing members that can be made out of them, which is of particular importance to obtain a good fit for an object as complex as a human foot. Other possible materials are, for example, metal, wood, or injection-molded plastic materials.

Potential methods for the manufacture of the reinforcing members 121-125 include: molding (e.g. injection molding), additive manufacturing (e.g., 3D printing), or carbon extrusion, for example.

Details pertaining to a method for the manufacture of reinforcing members or structures containing hollow (e.g., tube-shaped) sections are discussed below in relation to FIGS. 15a-b.

A further feature of the sole 100, which was already briefly touched upon above but which becomes more clearly visible from the top view in FIG. 1c and the medial side views of FIGS. 1d and 1e is that the load distribution member 140 and the rear ends of the reinforcing members 121-125 overlap at least partially (in a vertical projection of the sole as best seen in FIG. 1c). The overlap region is indicated by reference numeral 145 in FIGS. 1c-1e. What this overlap does is that, even though the reinforcing members 121-125 and the load distribution member 140 are provided as individual parts of the sole 100 and are separated by the upper midsole part 111 (it is pointed out however that, generally, a physical connection between these parts is also possible), there is still some interplay or interlock between the two, in the sense that the material of the upper midsole part 111 couples the two together and the overall stability of the sole through the entire gait cycle (when the main pressure point typically moves from the heel area through the midfoot area up to the toes, for push-off) is improved, without any sudden jumps or discontinuity of the response of the sole to the acting forces.

Alternatively or in addition to having such a load distribution member 140, the sole may also comprise a forefoot support plate, as discussed below in relation to FIGS. 11a-f.

Figure 2:
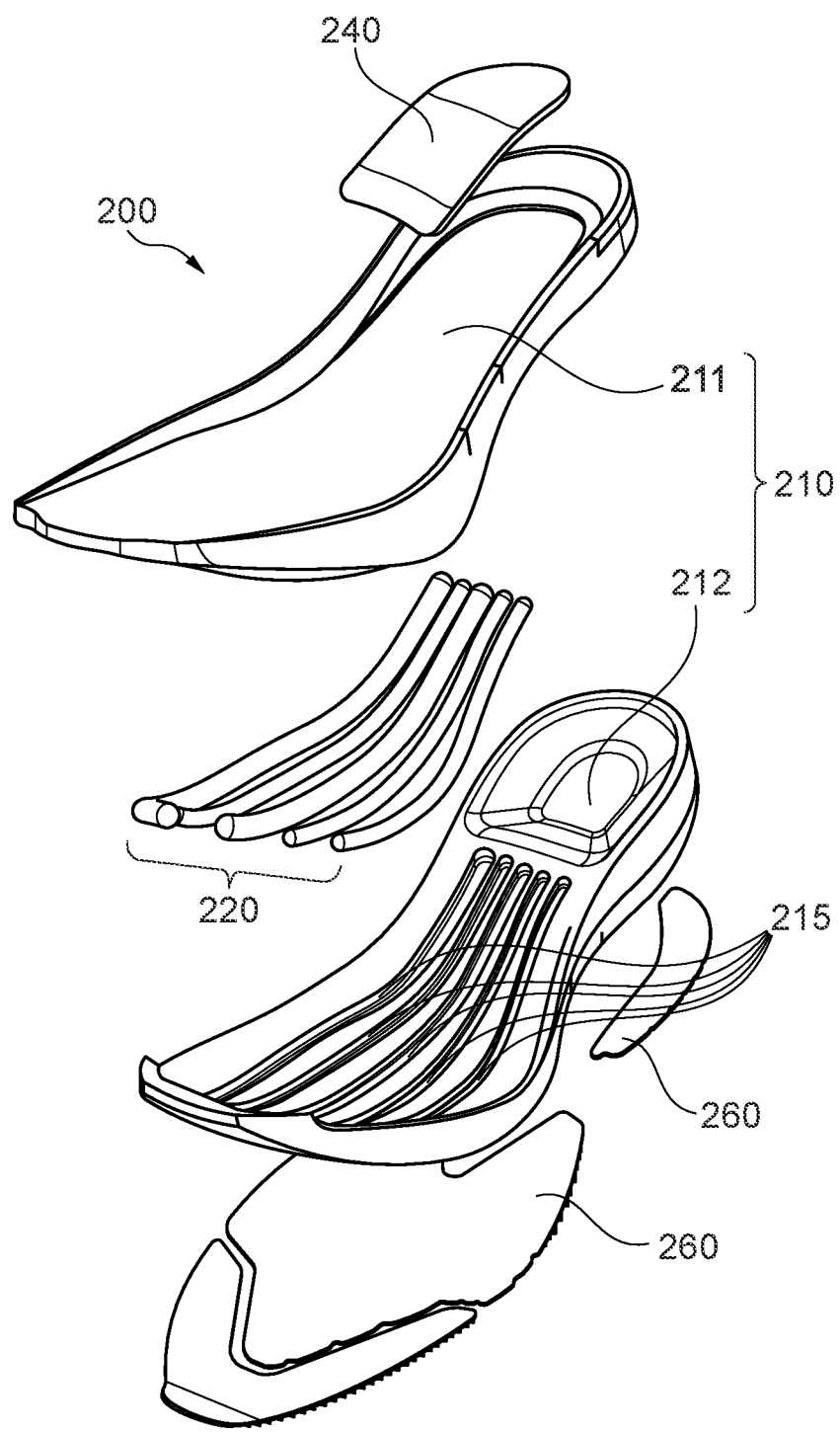
FIG. 2 shows an exploded isometric view of a sole according to some embodiments.

A sole 200 according to some embodiments (shown in FIG. 2 as an exploded view) is very similar to that of FIGS. 1a-f. All of what has been said about the corresponding members, elements and components of the sole 100 therefore also applies to sole 200 of FIG. 2 (unless physically or technically ruled out) and is therefore not repeated again.

The sole 200 comprises a midsole 210 with an upper midsole part 211 and a lower midsole part 212, between which five reinforcing members 220 are positioned. The reinforcing members 220 are completely embedded within the midsole 210. The reinforcing members 220 are again rod-shaped or tube-shaped, and the reinforcing members corresponding to the first and third metatarsal have a larger diameter than the other three reinforcing members. The sole also comprises a load distribution member 240 arranged predominately in the heel area and on top of the upper midsole part 211, as well as an outsole 260, which in the embodiment shown here comprises several individual sub-parts. However, in some embodiments, the outsole can comprise one unitary piece.

In some embodiments, the lower midsole part 212 comprises five grooves 215, each corresponding to one of the five reinforcing members 220. This may help to secure the reinforcing members 220 in their position and thus help to avoid or limit the use of adhesives or glues, for example, and to generally facilitate assembly of the sole 200.

A sole 300 according to some embodiments (shown in FIGS. 3a and 3b) is again quite similar to that of FIGS. 1a-f and FIG. 2. All of what has been said about the corresponding members, elements and components of the soles 100 and 200 therefore also applies to sole 300 of FIGS. 3a and 3b (unless physically or technically ruled out) and is therefore also not repeated.

Figure 3A:
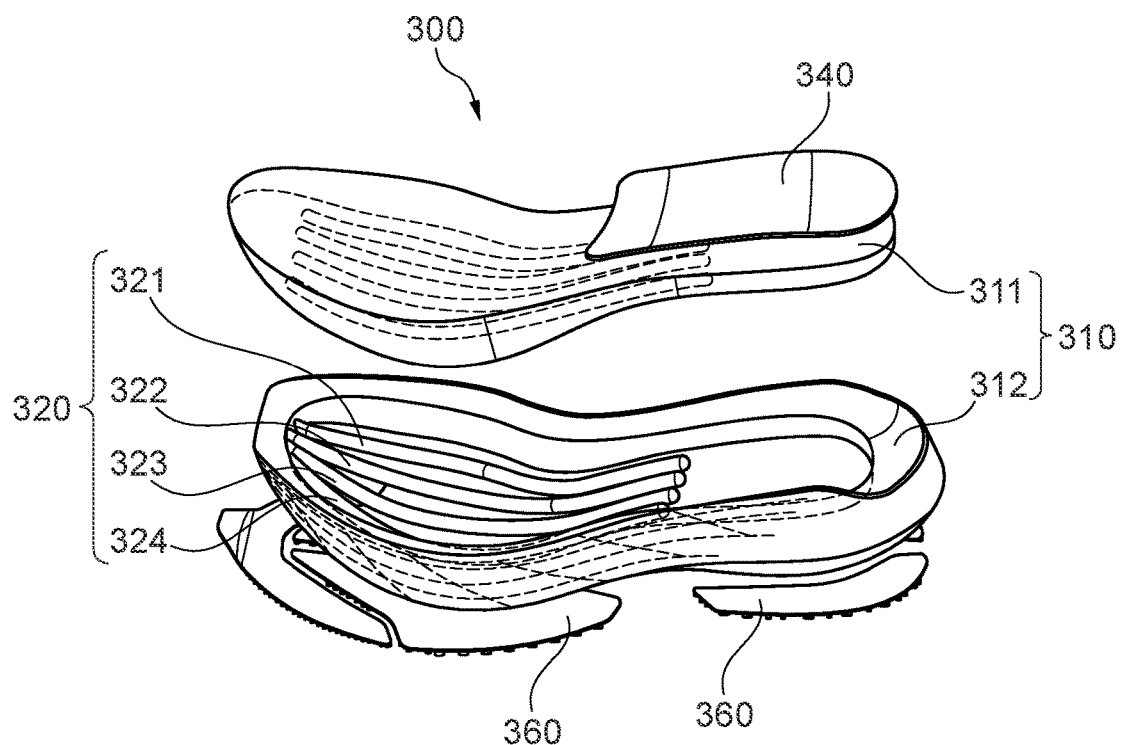
FIG. 3a shows an exploded isometric view of a sole according to some embodiments.
Figure 3B:
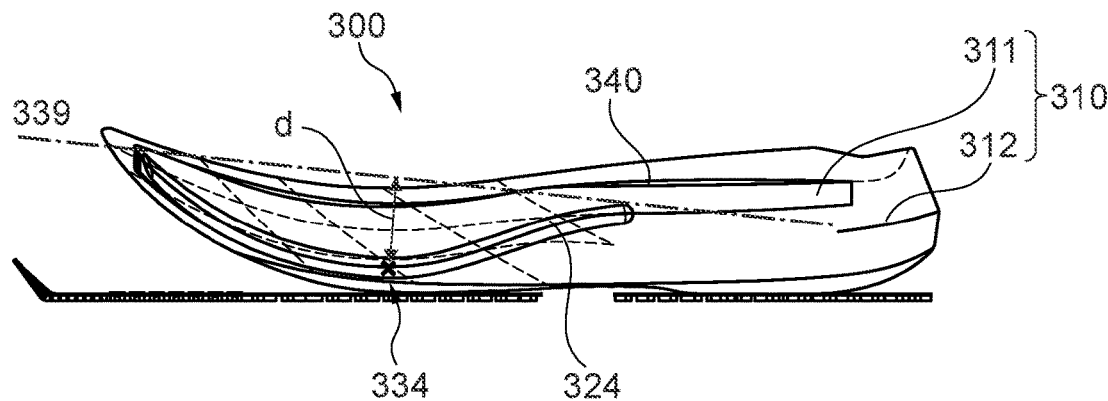
FIG. 3b shows a side view of the sole of FIG. 3a according to some embodiments.

FIG. 3a shows an exploded view of the sole 300, and FIG. 3b shows a side view of the sole 300.

The sole 300 comprises a midsole 310 with an upper midsole part 311 and a lower midsole part 312, but now with only four reinforcing members 321-324 positioned between them to form the reinforcing structure 320. This structure is again completely embedded within the midsole 310.

Reducing the number of individual reinforcing members may, for example, simplify the construction and reduce weight and costs. On the other hand, it might give up a certain degree of control over the reinforcing function provided by the reinforcing structure 320, compared to the structure 120 with five individual members 121-125, for example. On the other hand, it may well be found that for a specific activity, support of the fifth metatarsal and fifth toe may not be necessary, and then one reinforcing member may simply be omitted with the remaining four reinforcing members 321-324 still corresponding to the first to fourth metatarsal. Or the most lateral of the four reinforcing members, i.e. reinforcing member 324, may be associated with supporting both the fourth and fifth metatarsal, while the first three reinforcing members 321-323 correspond to one metatarsal each. Further permutations in this regard are conceivable for a person of ordinary skill in the art. The reinforcing members 321-323 are once again rod-shaped or tube-shaped, as shown in FIGS. 3a and 3b.

The sole 300 also comprises a load distribution member 340 arranged predominately in the heel area and on top of the upper midsole part 311. The sole also comprises an outsole 360, with several individual sub-parts.

FIG. 3b once again illustrates the meaning of the low points of the reinforcing members and their distance to the plane 339 tangential to the upper side of the reinforcing structure 320 that is formed by the reinforcing members 321-324. Indicated in FIG. 3b is one of the low points, specifically the low point 334 of the reinforcing member 324. For the other reinforcing members 321-323, the situation is similar. The low point 334 can be thought of as the point of the flow-line of the reinforcing member 324 closest to the ground, i.e. the horizontal plane. The reference-plane 339, on the other hand, is the plane tangential to the upper side of the structure formed by the reinforcing members 321-324 (this plane 339 may be thought of as a lid that is laid on top of the structure). The distance d from this plane is referred to as the depth of the respective low point (here, the low point 334).

Figure 4:
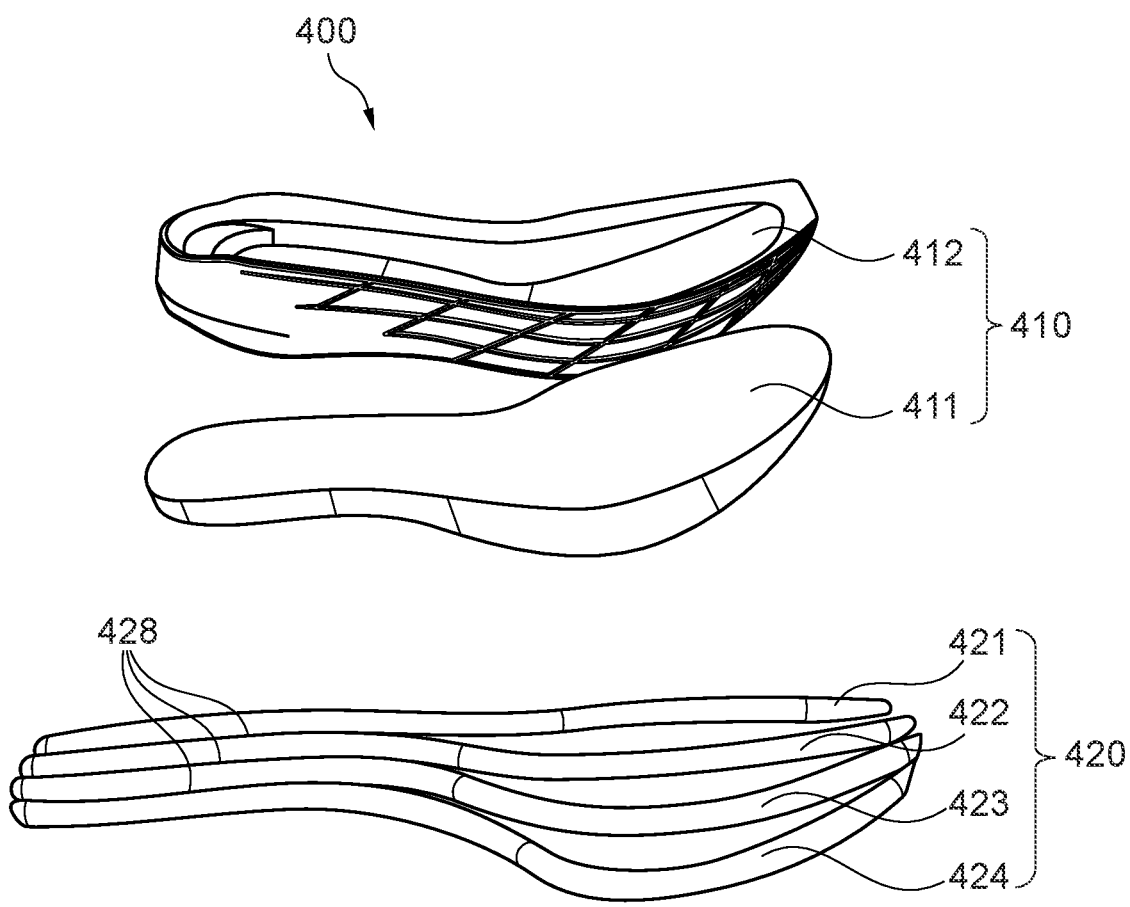
FIG. 4 shows a sole according to some embodiments.

FIG. 4 shows a sole 400 according to some embodiments in a dissembled state, very similar to that of FIGS. 3a and 3b. Again, analogous statements as above with regard to, for example, the sole 300 apply and are not therefore repeated here.

The sole 400 comprises a midsole 410 with an upper midsole part 411 and a lower midsole part 412. In sole 400 shown in FIG. 4, both parts 411 and 412 are made from a homogeneous TPEE foam material. However, the parts 411 and 412 may generally be made from all of the materials mentioned herein. For example, the upper midsole part 411 may comprise a particle foam with particles of ePEBA and the lower midsole part 412 may comprise a particle foam with particles of eTPEE, or vice versa.

The sole also comprises a reinforcing structure 420 with four reinforcing members 421-424 to be positioned between the midsole parts 411, 412 and to be completely embedded within the midsole 410.

A particular feature of the reinforcing structure 420 is that the four reinforcing members 421-424 are connected in the midfoot area by a connection member 428, which is provided as small connecting bars between the individual reinforcing members 421-424. This may facilitate assembly of the sole 400 but also manufacturing of four reinforcing members 421-424 themselves, as the individual reinforcing members may be manufactured or molded as a single, (partly) connected unit. The connection member 428 may also increase the stability of the sole 400 in the midfoot area. It is noteworthy that in the front half of the sole, in particular in the forefoot area, there is no connection between the reinforcing members 421-424, to not impede their ability to deflect individually under the forces acting during a gait cycle.

Using a connection member like member 428 may also compensate (at least partly) for not using a load distribution member in the heel area of the sole, as is the case for the sole 400 shown in FIG. 4. On the other hand, such a load distribution member may also be added to the sole 400, to provide even better stability in the heel area.

Figure 5A:
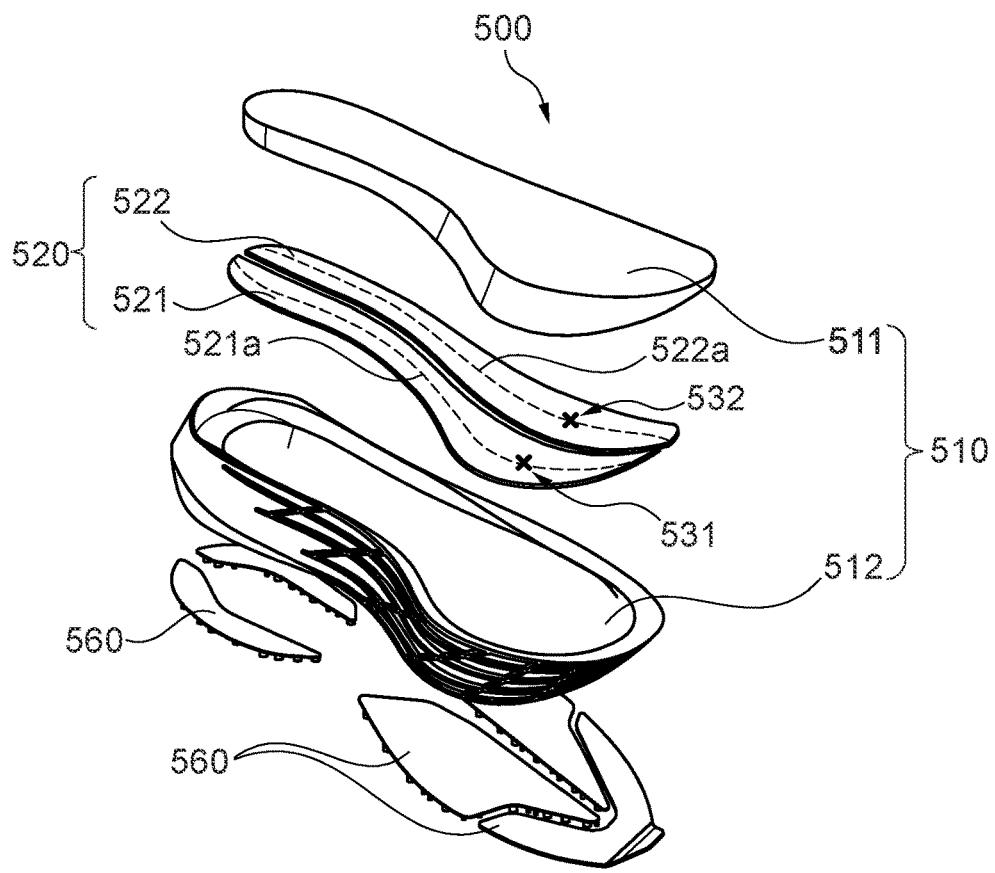
FIG. 5a shows an exploded isometric view of a sole according to some embodiments.
Figure 5B:
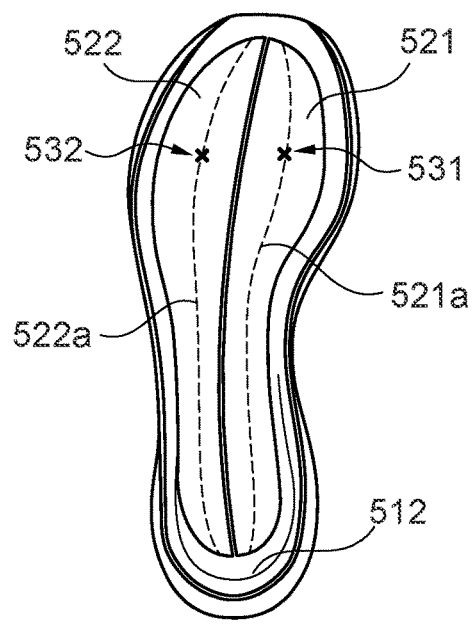
FIG. 5b shows a top down view of the sole of FIG. 5a according to some embodiments.

FIGS. 5a and 5b show a sole 500 according to some embodiments. FIG. 5a shows an exploded view of the entire sole 500, and FIG. 5b a top view of only some of the parts.

The sole 500 again comprises a midsole 510 with an upper midsole part 511 and a lower midsole part 512, as well as an outsole 560 with several individual pieces. All of what has been said with regard to these components in the context of the soles 100, 200, 300, and 400 also applies here (as far as physically and technically compatible) and is not repeated again.

A difference to the soles 100, 200, 300, and 400 described above lies in the shape and structure of the reinforcing structure 520, which in the case at hand is provided by two plate-like reinforcing members 521 and 522. Even though these two reinforcing members have a different shape than the reinforcing members discussed above, they are still configured to be independently deflected by the forces acting on them during a gait cycle. Despite their plate-like shape, the reinforcing members 521 and 522 may also have a hollow core or hollow sections, for example. They may also be solid members.

Another difference to the embodiments described above is that the reinforcing members 521 and 522 extend rearwardly beyond the midfoot area and into the heel area, up to the calcaneus. This can increase the stiffness of the entire sole, not only the front half.

Further indicated in FIGS. 5a and 5b are the flow-lines 521a, 522a, of the reinforcing members 521, 522, respectively. As discussed above, for reinforcing members with a non-circular (or more generally non-symmetrical) cross-section, a way to define the flow-line is to (conceptually) divide the member into equidistant slices, determine the center of mass of each slice, and piece these points together to obtain the flow-line. As was the case with the low points 131-135 discussed above, also here the position of the flow-lines 521a, 522a has not been determined with absolute mathematical precision, but is only roughly indicated, to illustrate the point at hand.

What can be seen from the flow-lines is that both reinforcing members 521 and 522 comprise a non-linear section extending across the front half of the sole 500. In the back half of the sole 500, the reinforcing members 521 and 522 comprise straight or at least approximately straight sections. More specifically, in the front half of the sole 500 the reinforcing members 521 and 522 provide a concave shape to the reinforcing structure 520, with both low points 531 and 532 sitting a certain distance below the plane tangential to the upper side of the reinforcing structure 520. Suitable values for a lower boundary on this distance have already been discussed and are not repeated again, because the discussed values may also apply to plate-like reinforcing members like the members 521 and 522.

Figure 6A:
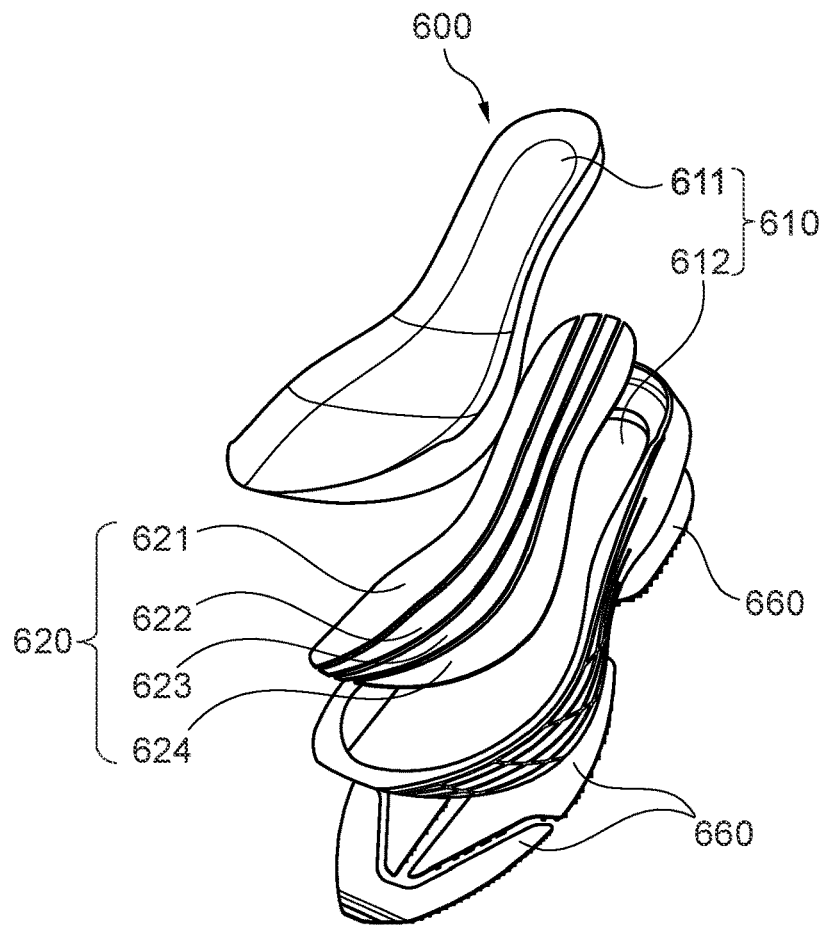
FIG. 6a shows an exploded isometric view of a sole according to some embodiments.
Figure 6B:
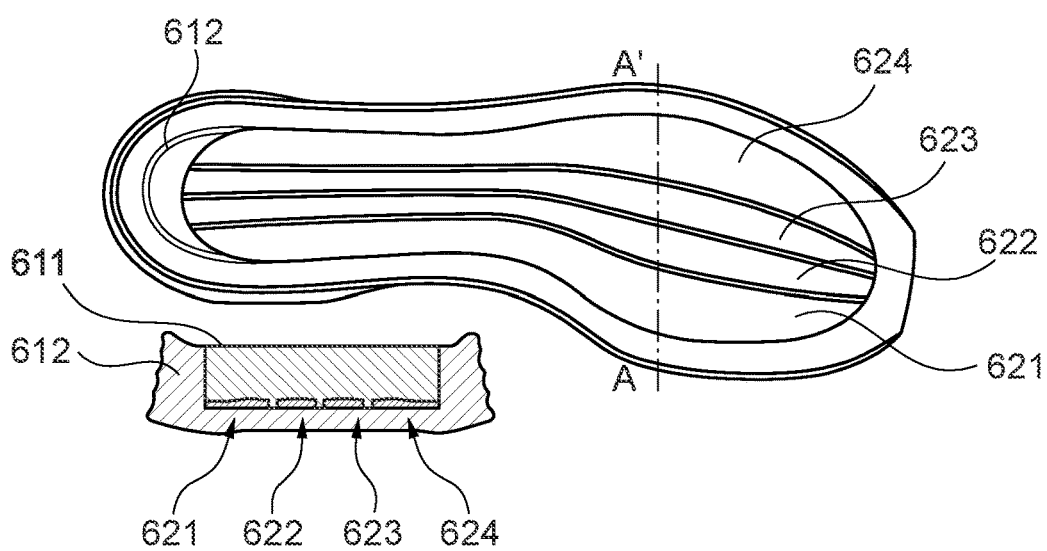
FIG. 6b shows a top down view of the sole of FIG. 6a according to some embodiments.
Figure 6C:
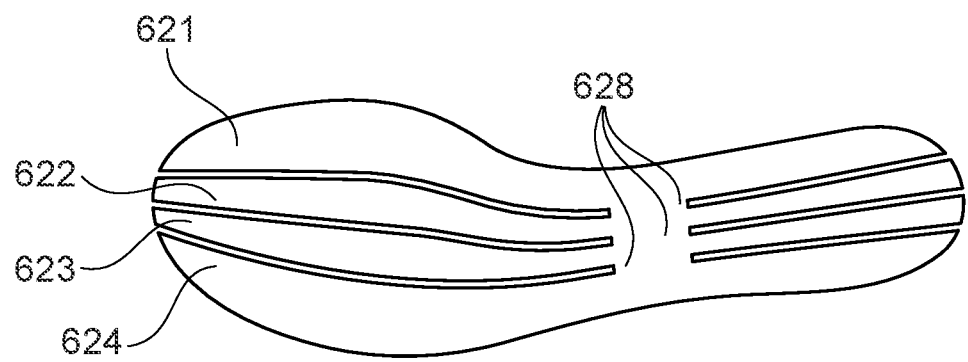
FIG. 6c shows a top down view of the sole of FIG. 6a according to some embodiments.
Figure 6D:
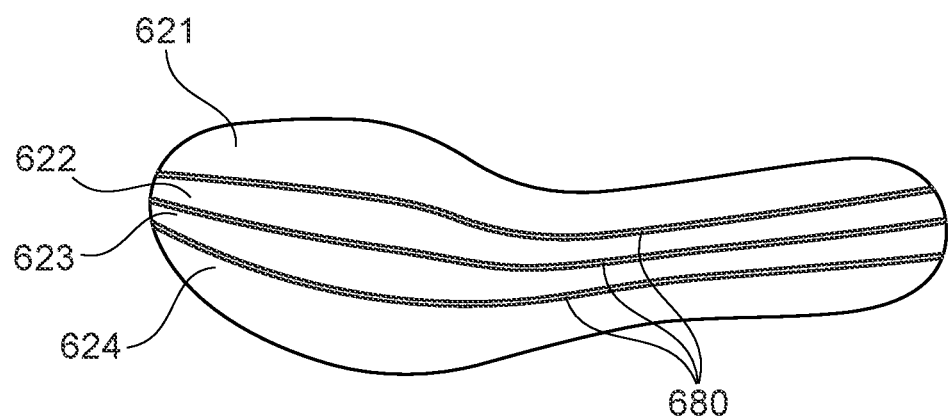
FIG. 6d shows a top down view of the sole of FIG. 6a according to some embodiments.

FIGS. 6a-6d show further variations of the basic construction provided by the sole 500. FIG. 6a shows an exploded view of a sole 600 according to some embodiments, and FIG. 6b shows a top view of some of the parts of the sole 600 and a corresponding cross-section along the line A-A. FIGS. 6c and 6d show possible modifications of the reinforcing structure.

The sole 600 once more comprises a midsole 610 with an upper midsole part 611 and a lower midsole part 612, as well as an outsole 660 with several individual parts. These components have already been extensively discussed and all of the above-said also applies here.

In the sole 600, the reinforcing structure 620 is provided by four plate-like reinforcing members 621-624, compared to the two of the sole 500. One specific feature of the sole 600 is that the reinforcing members 621-624 have slightly raised sections 631-634 along their central longitudinal axes (i.e., at least approximately following their flow-lines), starting approximately at the rear end of the foot arch and extending forwardly up to the toe area. For example in the cross-section along the cut-line A-A shown in the bottom left of FIG. 6b, these slightly raised sections 631-634 can be discerned. Such raised sections 631-634 can, for example, increase the stiffness of the reinforcing members 621-624 in the sections where they are applied.

FIG. 6c shows a further possible modification of the reinforcing structure 620 provided by the reinforcing members 621-624, in that the reinforcing members 621-624 may be connected in the back half of the sole 600, e.g., in the area of the foot arch, by a connecting member 628, here in the form of bars each connecting two adjacent reinforcing members. It may be preferred that this connection is limited to the back half of the sole 600, so that the reinforcing members' ability to respond and react independently to the acting forces in the front half of the sole 600 is not impaired by the connection.

Another option to increase the overall stability of the sole 600 while not unduly impairing the independency of movement of the individual reinforcing members 621-624 is illustrated in FIG. 6d. Instead of connecting the reinforcing members 621-624 among each other, the reinforcing members 621-624 are here laminated (or otherwise connected) to a mesh-like material 680. Such a material may be highly tear-resistant but still sufficiently flexible to allow a good compromise between stability and independency of movement of the individual reinforcing members 621-624. It may also facilitate assembly of the sole 600 and increase its life-span and durability.

Figure 7A:
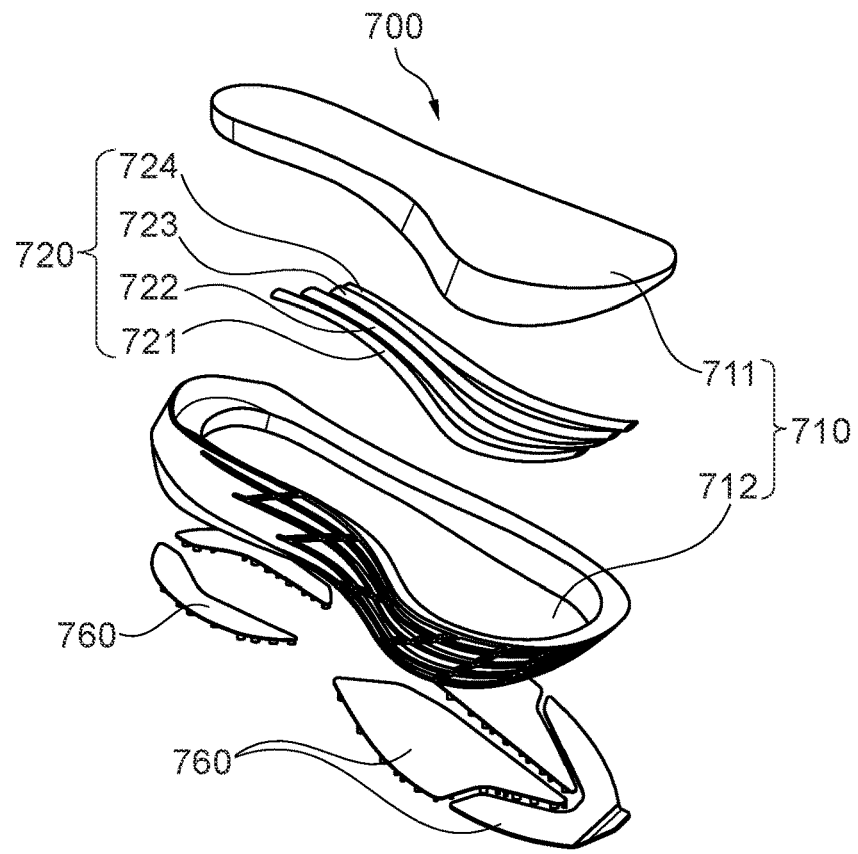
FIG. 7a shows an exploded isometric view of a sole according to some embodiments.
Figure 7B:
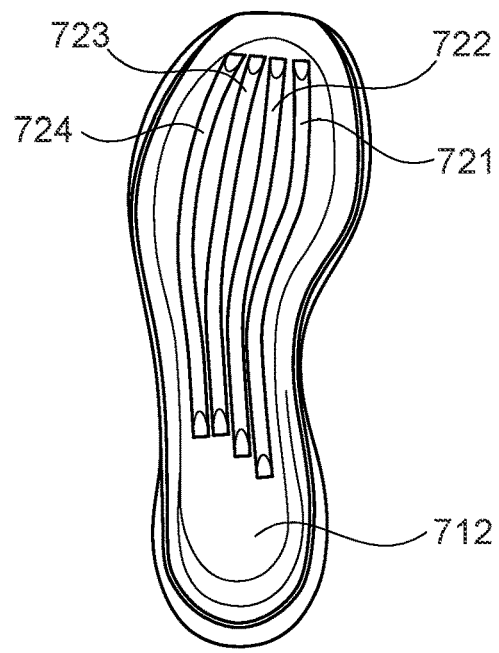
FIG. 7b shows a top view of the sole of FIG. 7a according to some embodiments.
Figure 8A:
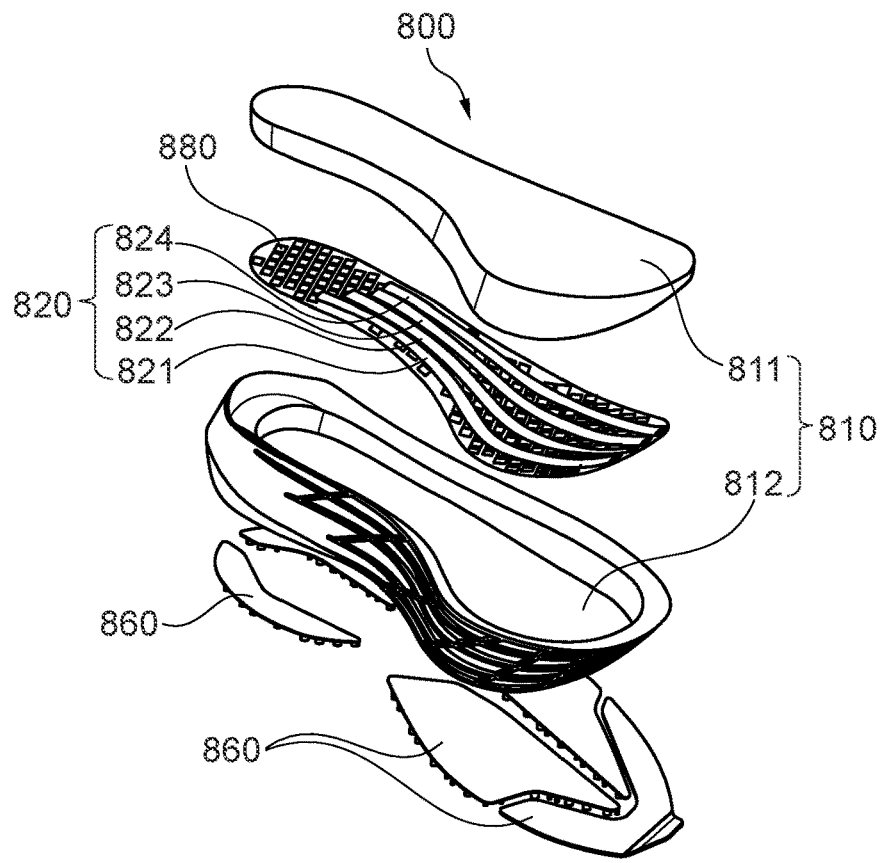
FIG. 8a shows an exploded isometric view of a sole according to some embodiments.
Figure 8B:
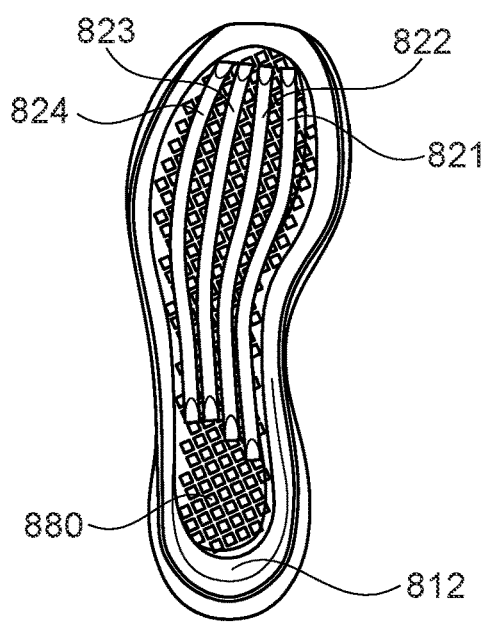
FIG. 8b shows a top down view of the sole of FIG. 8a according to some embodiments.

FIGS. 7a and 7b as well as FIGS. 8a and 8b show soles according to some embodiments. FIGS. 7a and 8a show exploded views of shoe soles 700, 800, respectively, and FIGS. 7b and 8b respectively show corresponding top views of some parts of the soles 700, 800.

The soles 700 and 800 are quite similar, for example, to the sole 300 discussed above. Both soles comprise a midsole 710, 810 with an upper midsole part 711, 811 and a lower midsole part 712, 812 as well as an outsole 760, 860, respectively. Both soles 700, 800 also comprise a reinforcing structure 720, 820 with four reinforcing members 721-724 and 821-824, respectively.

Redundancies are therefore avoided by not repeating everything that has been said about the corresponding elements and components above, which also applies to the embodiments 700, 800 at hand.

One difference, though, is the cross-section of the reinforcing members 721-724 and 821-824. These are a hybrid between plate-like and rod-shaped or tube-shaped, and the cross-section also changes along the reinforcing members. While the front and back tips of the reinforcing members 721-724 and 821-824 are flattened out, their middle sections are circular or elliptic in cross-section. Flattening out the tips, in particular towards the front of the sole 700, 800, may be beneficial because the sole typically becomes thinner towards its front end and there is thus less room to accommodate the reinforcing members. Thinning them out towards the front end may thus help to avoid an excessively thick and bulky front half of the sole.

Moreover, the reinforcing members 721-724 and 821-824 also differ in their individual length. Generally, the longer a reinforcing member is, the more transitional support during the stance phase it will provide, as well as a better guidance through the engineered motion. Choosing different lengths for the reinforcing members 721-724 and 821-824 customizes the force distribution along the different metatarsal bones in a more anatomical and ergonomical manner, compared to known unitary structures.

It is explicitly noted at this position that this option of choosing different length for the different reinforcing members also pertains to all other embodiments described in this document (unless explicitly stated otherwise), and is not limited to the specific embodiments 700 and 800 of FIGS. 7a-b and 8a-b.

The sole 800 also includes a mesh-like material 880, onto which the reinforcing members 821-824 are laminated, or otherwise connected to, to increase the overall stability, facilitate assembly, and/or increase the life-span of the sole 800, for example.

FIGS. 9a-b and 10a-d show shoe soles 900 and 1000a-d with different configurations of rod-shaped or tube-shaped reinforcing members, according to some embodiments.

The soles 900 and 1000a-d shown in FIGS. 9a-b and 10a-d are again similar, to the soles 100 and 200 of FIGS. 1a-f and 2. All of what has been said about the corresponding members, elements and components above, in particular about the soles 100 and 200, therefore also applies to soles 900 and 1000a-d of FIGS. 9a-b and 10a-d (unless physically or technically ruled out, of course) and is therefore not repeated again.

Figure 9A:
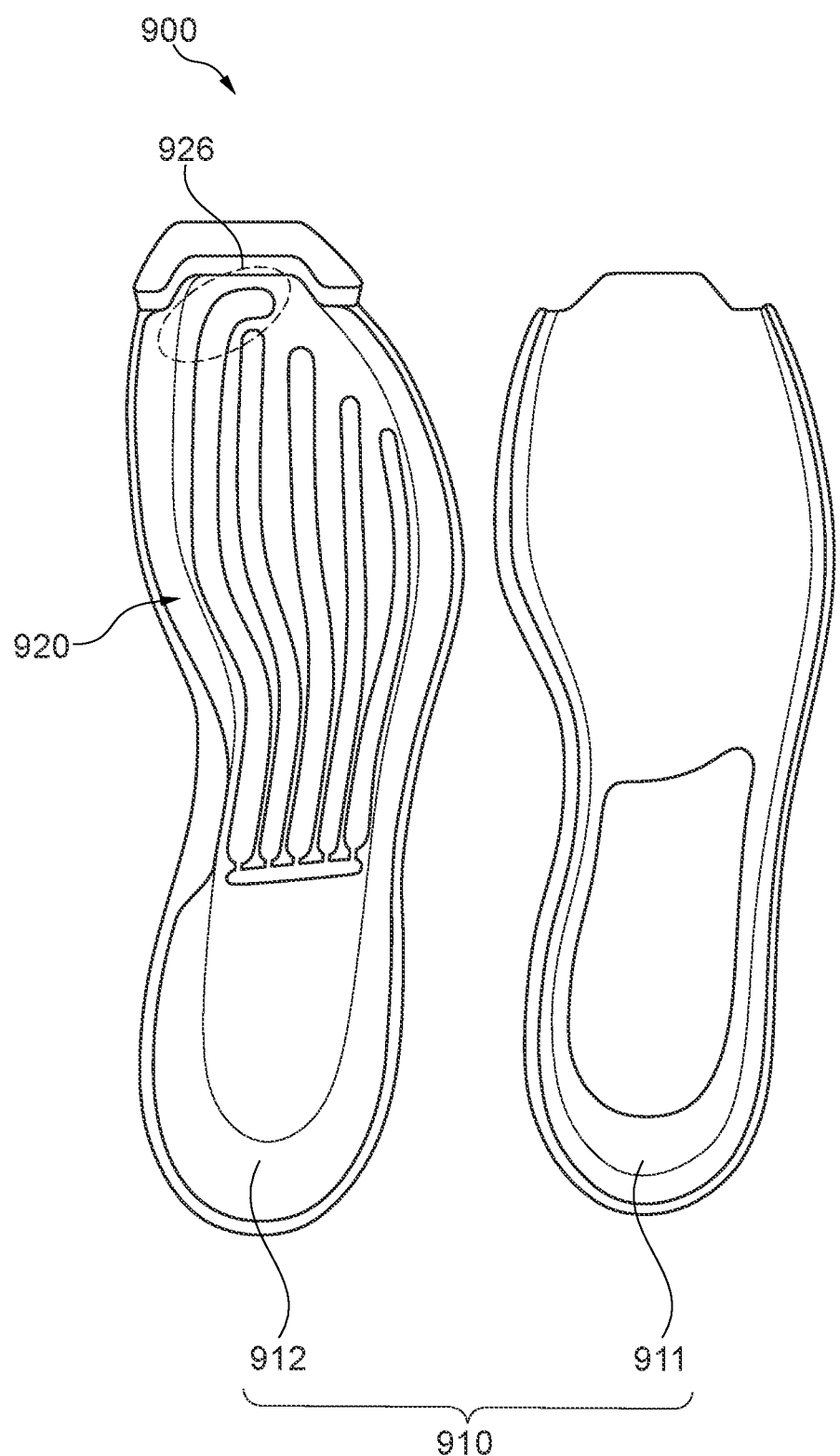
FIG. 9a shows a top down view of a sole according to some embodiments.

The sole 900 shown in FIG. 9a comprises a midsole 910 with a lower midsole part 912. The corresponding upper midsole part 911 to be placed on top of the reinforcing structure 920 is shown on the right-hand side of FIG. 9a. The upper midsole part 911 has a recess in the back half of the sole, into which a load distribution member (not shown in FIG. 9a) may be placed, as already discussed. In the embodiment shown here, both midsole parts 911, 912 are made from a homogeneous foam material, but any of the above-mentioned materials suitable for use in a midsole of an inventive sole could also be employed. FIG. 9a shows a sole for the right foot.

Figure 9B:
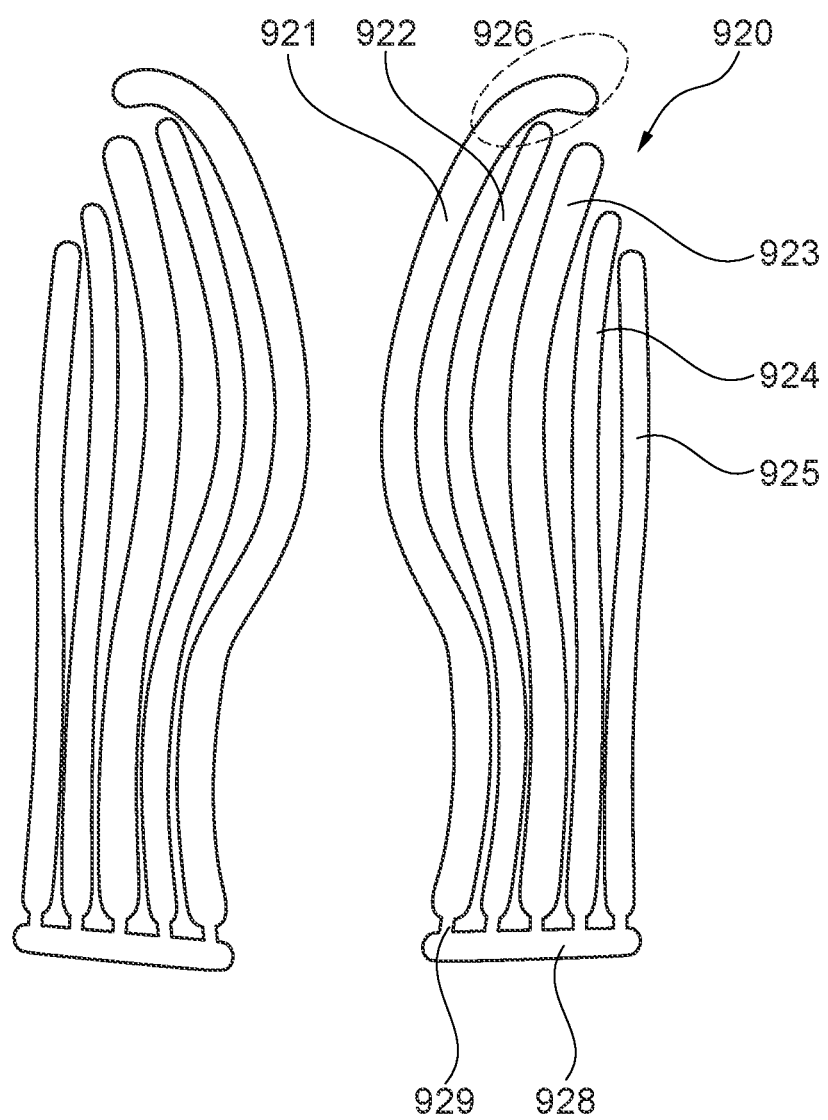
FIG. 9b shows a top down view of reinforcing members of soles according to some embodiments.

The reinforcing structure 920, which is again shown in isolated form on the right hand side of FIG. 9b comprises five tube-shaped or rod-shaped reinforcing members 921-925, each corresponding to one toe of the foot/metatarsal bone (on the left hand side of FIG. 9b, the corresponding mirror image, i.e. the corresponding structure for the left foot, is also shown). The medial reinforcing member 921 corresponds to the big toe/first metatarsal bone and curls in (e.g., region 926) underneath the big toe to provide additional support for toe-off in this area.

The reinforcing members 921 and 923 corresponding to the first and third toe/metatarsal bone have a larger diameter than the remaining three reinforcing members 922, 924, and 925 to provide additional support by their increased stiffness to the first and third toe/metatarsal bone. If shaped tube-like (e.g. hollow or with hollow sections), the reinforcing members 921 and 923 can alternatively or additionally also have a larger wall thickness than the remaining three reinforcing members 922, 924, and 925.

The five reinforcing members 921-925 extend throughout the front half of the sole 900 and approximately up to the back edge of the arch region, where they are connected by a connecting member 928, which in the case at hand is also provided as a rod-shaped or tube-shaped member. Each of the five reinforcing members 921-925 is connected to the connecting member 928 by a short passage 929 of reduced diameter. This connection at the back edge of the arch region can provide an additional degree of stability to this sensitive region of the foot to help avoid injuries or fatigue of the wearer.

Figure 10A:
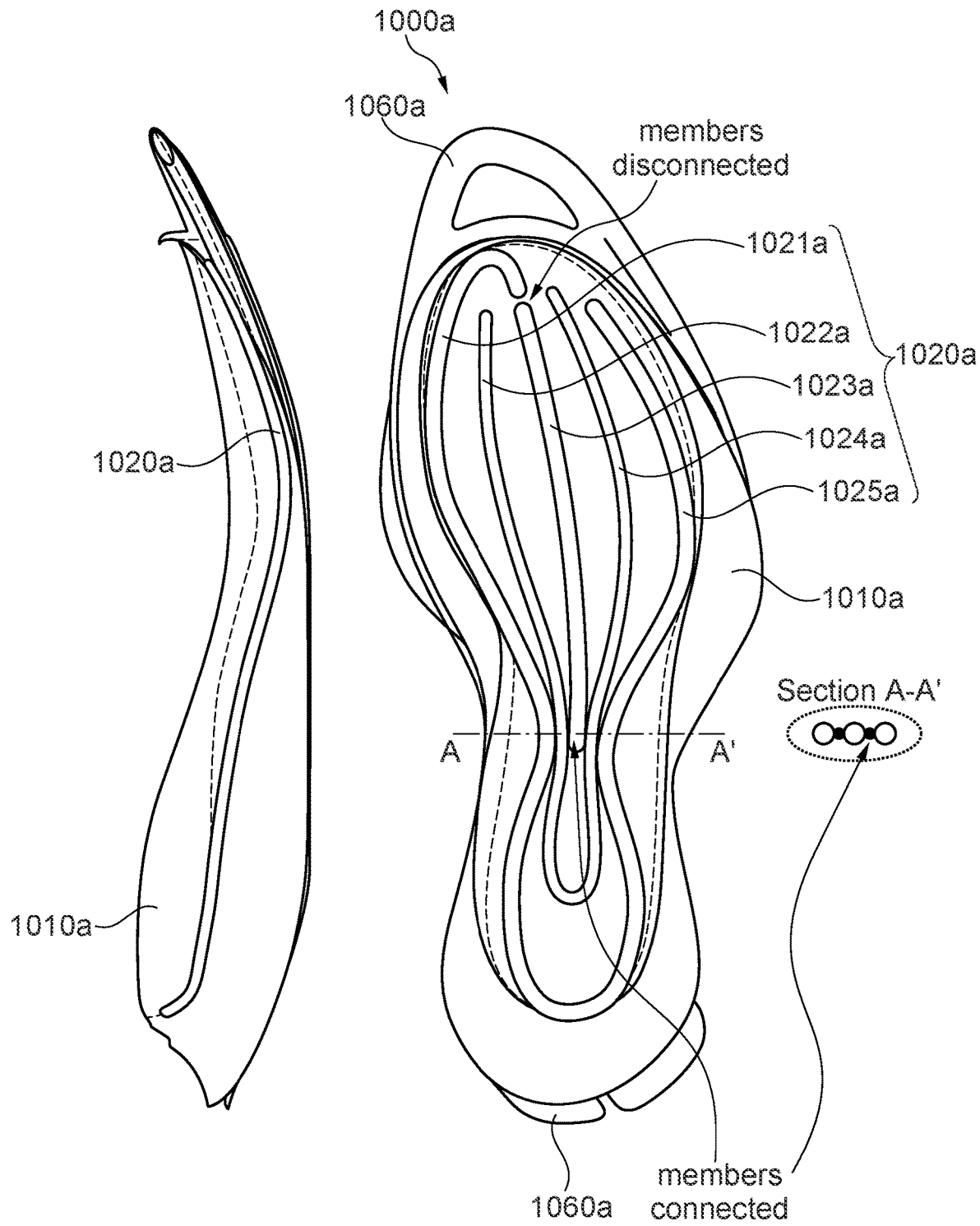
FIG. 10a shows a sole according to some embodiments.
Figure 10B:
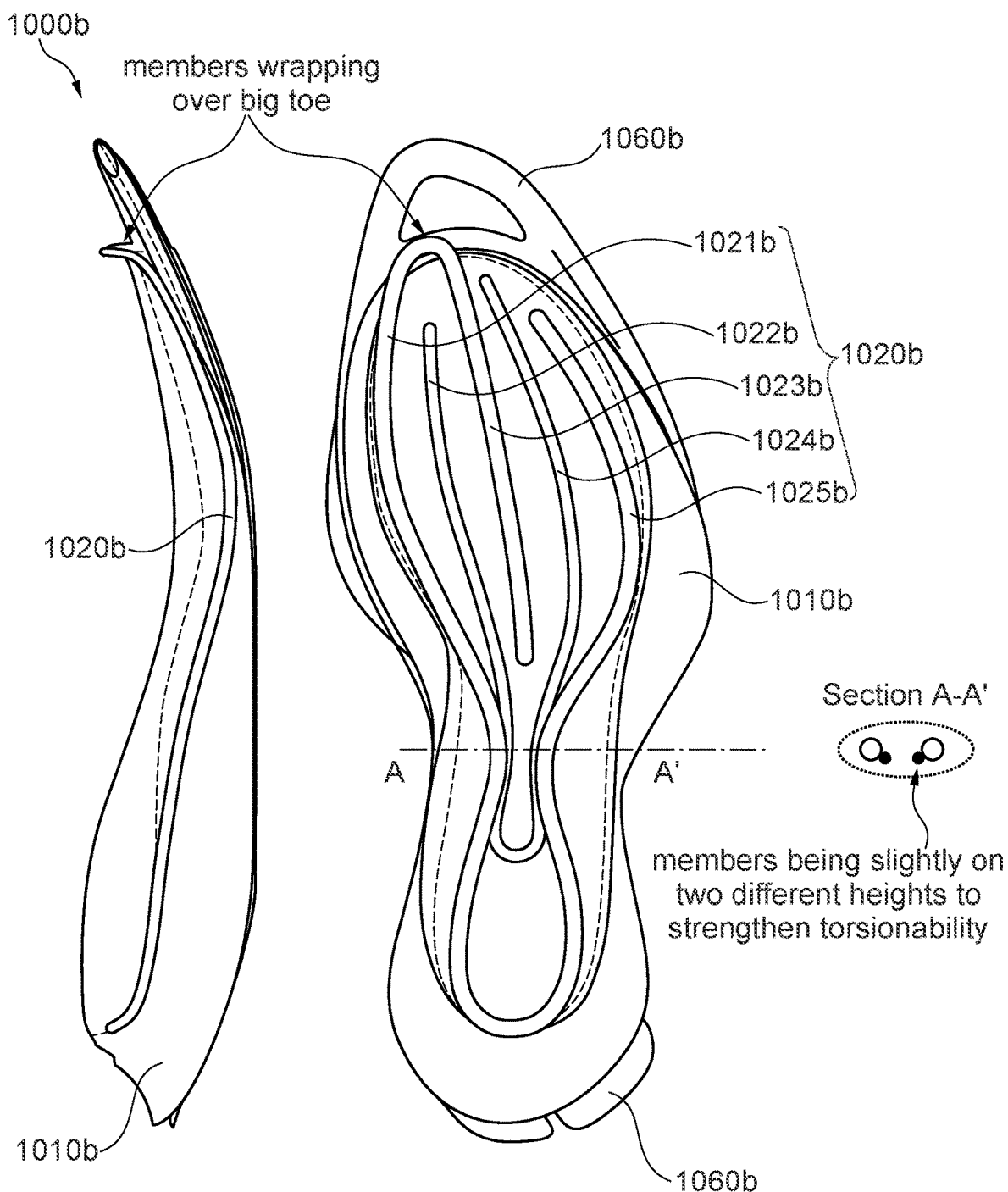
FIG. 10b shows a sole according to some embodiments.
Figure 10C:
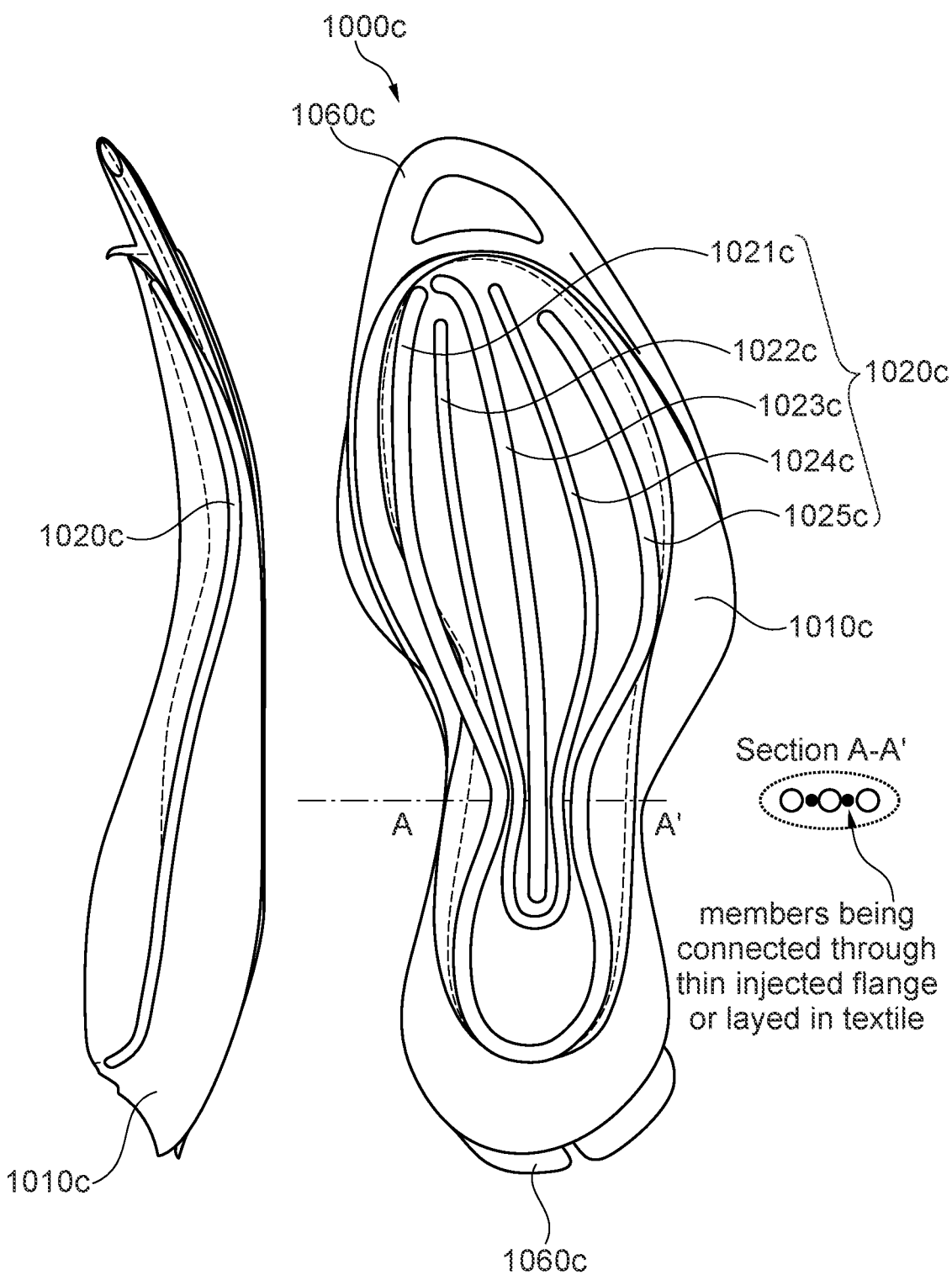
FIG. 10c shows a sole according to some embodiments.
Figure 10D:
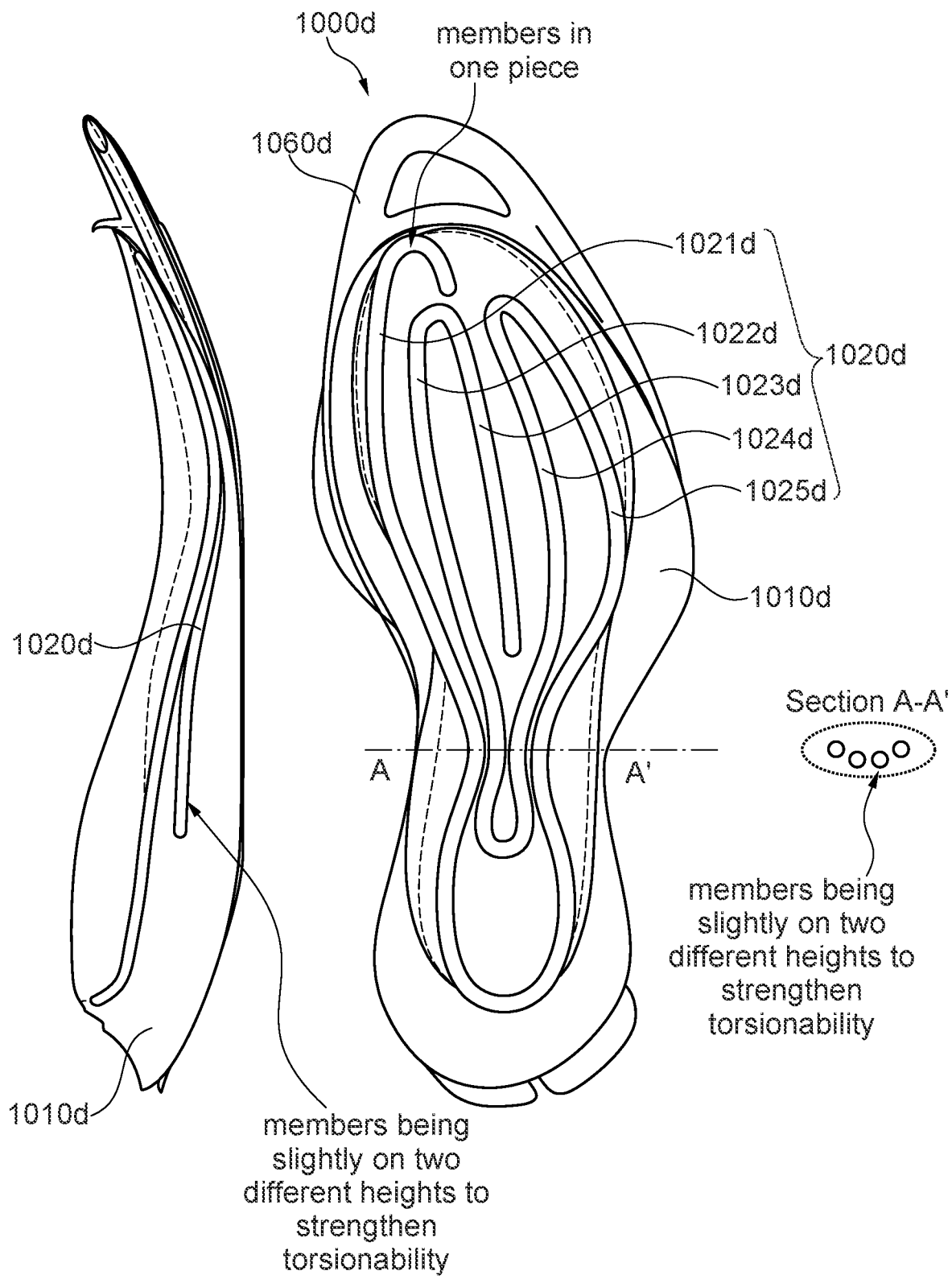
FIG. 10d shows a sole according to some embodiments.

The soles 1000a-d shown in FIGS. 10a-d again comprise a midsole 1010a-d, which may be of any of the constructions and/or materials mentioned in this regard in the present disclosure (e.g., a particle and/or homogeneous foam material). The right-hand picture in each figure shows a top view of the respective sole 1000a-d, and the left-hand picture a lateral side view. At least partially embedded within the midsoles 1010a-d are respective reinforcing structures 1020a-d. In particular at the toe end of the soles, the respective reinforcing structures 1020a-d may also partially protrude from or be exposed at the bottom side of the midsole (as shown in FIGS. 10a and 10b), or at least be arranged in close proximity to the bottom surface of the midsole (as shown in FIGS. 10c and 10d).

Each of the reinforcing structure 1020a-d comprises five reinforcing members 1021a-1025a, 1021b-1025b, 1021c-1025c, and 1021d-1025d, respectively, extending throughout the front half of the sole 1000a-d and each corresponding to a respective toe/metatarsal bone of the foot. The reinforcing members 1021a-1025a, 1021b-1025b, 1021c-1025c, and 1021d-1025d also extend beyond the arch region and into the back half of the sole.

A peculiarity of the reinforcing structures 1020a-d is that some, or even all, of the reinforcing members 1021a-1025a, 1021b-1025b, 1021c-1025c and 1021d-1025d are formed from a continuous rod or tube of material (i.e. the reinforcing members are connected to and merge into each other in certain regions of the sole, in particular in the region underneath the rearfoot/heel). Still, at least two of the reinforcing members of each sole 1000a-d are independent from each other in the sense that they may react and deform independently under a pressure load during walking or running, in particular in the front half of the sole (as shown by the reinforcing members 1022b, 1024b, and 1025b in FIG. 10b and the reinforcing members 1021d and 1023d in FIG. 10d). In FIGS. 10a and 10c all five reinforcing members are independent and unconnected in the front half of the sole.

In the reinforcing structures 1020a, 1020b, and 1020c, the medial, lateral, and central reinforcing members (e.g., the reinforcing members 1021a, 1023a, 1025a and 1021b, 1023b, 1025b and 1021c, 1023c, 1025c) have a larger diameter than the remaining two reinforcing members of the respective structure, and they are provided as hollow tubes, while the thinner two reinforcing members are provided as solid rods. The difference in diameters is shown by the cross sections 10a-c taken in the arch region of each of the depicted soles 1000a-c in FIGS. 10a-c.

In the reinforcing structure 1020d of FIG. 10d, all five reinforcing members 1021d-1025d are provided as tubes of the same diameter and wall thickness, as shown by the cross section 10d in FIG. 10d. Here, the members 1022d and 1023d as well as 1024d and 1025d are also connected in the toe region, underneath the $2^{nd}$ and $3^{rd}$, and $4^{th}$ and $5^{th}$ metatarsal bone, respectively, to provide an additional support to these weaker toes (i.e., weaker compared to the big toe/$1^{st}$ metatarsal bone). A further particular feature of the structure is that the loop connecting the reinforcing members 1022d and 1024d in the arch regions lies lower within the midsole 1010d than the loop connecting the reinforcing members 1021d and 1025d (as shown in the left hand picture in FIG. 10d), hence providing a heel support that has a lower center and raised side rims, to provide a kind of heel cup the heel can settle into.

An outsole 1060a-d that may be attached to the midsoles 1010a-d is also schematically shown in FIGS. 10a-d.

FIGS. 11a-f show embodiments of a reinforcing structure 1120 and a forefoot support plate 1190 that may be incorporated into an embodiment of a sole, e.g. one of the soles 100-900 or 1000a-d discussed so far in this detailed description.

Figure 11A:
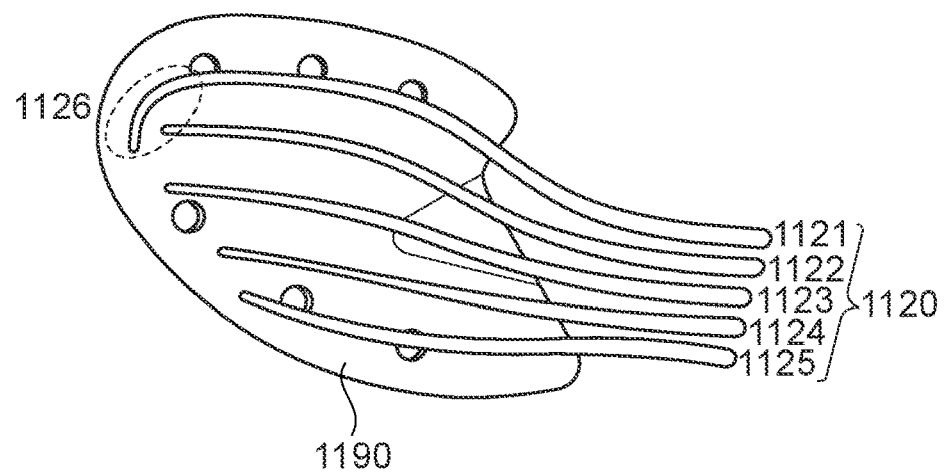
FIG. 11a shows a top down view of a reinforcing structure and support plate of a sole according to some embodiments.
Figure 11B:
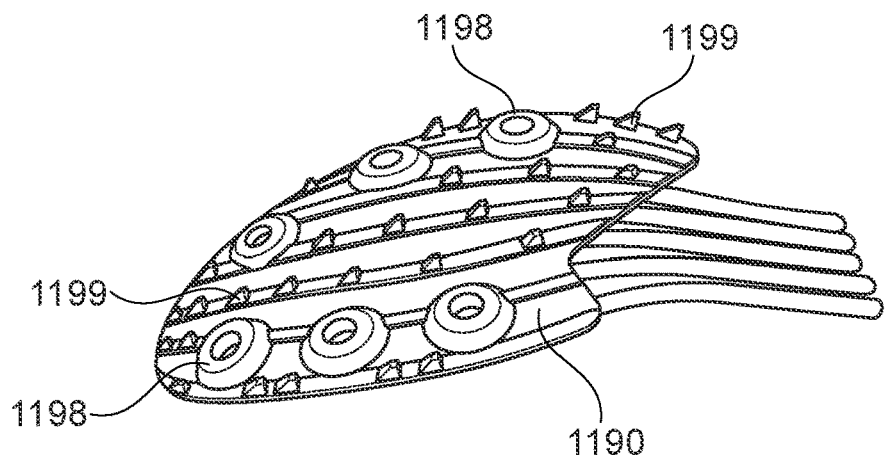
FIG. 11b shows a bottom view of a reinforcing structure and support plate of a sole according to some embodiments
Figure 11C:
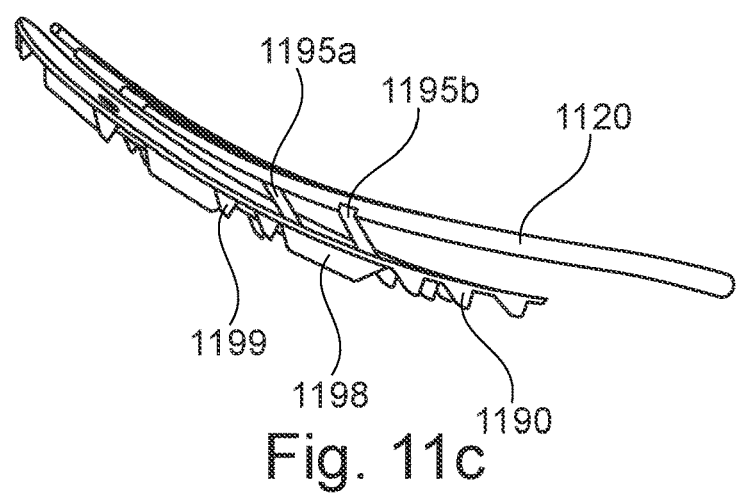
FIG. 11c shows a lateral side view of a reinforcing structure and support plate of a sole according to some embodiments
Figure 11D:
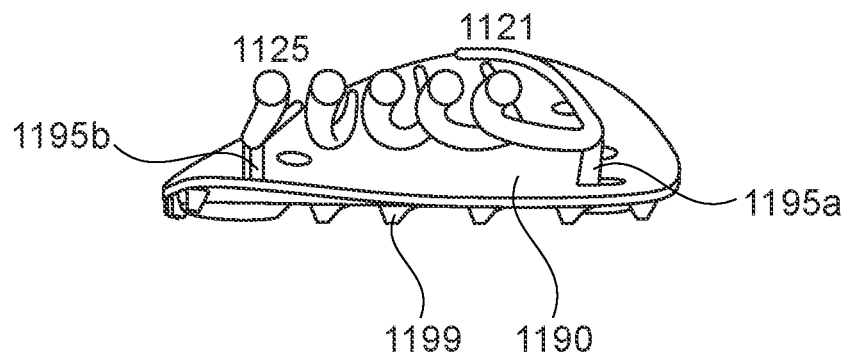
FIG. 11d shows a rear view of a reinforcing structure and support plate of a sole according to some embodiments
Figure 11E:
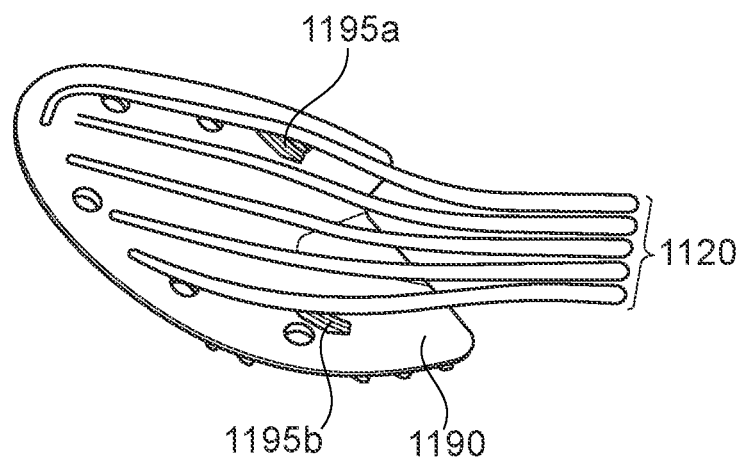
FIG. 11e shows a tilted lateral side view of a reinforcing structure and support plate of a sole according to some embodiments
Figure 11F:
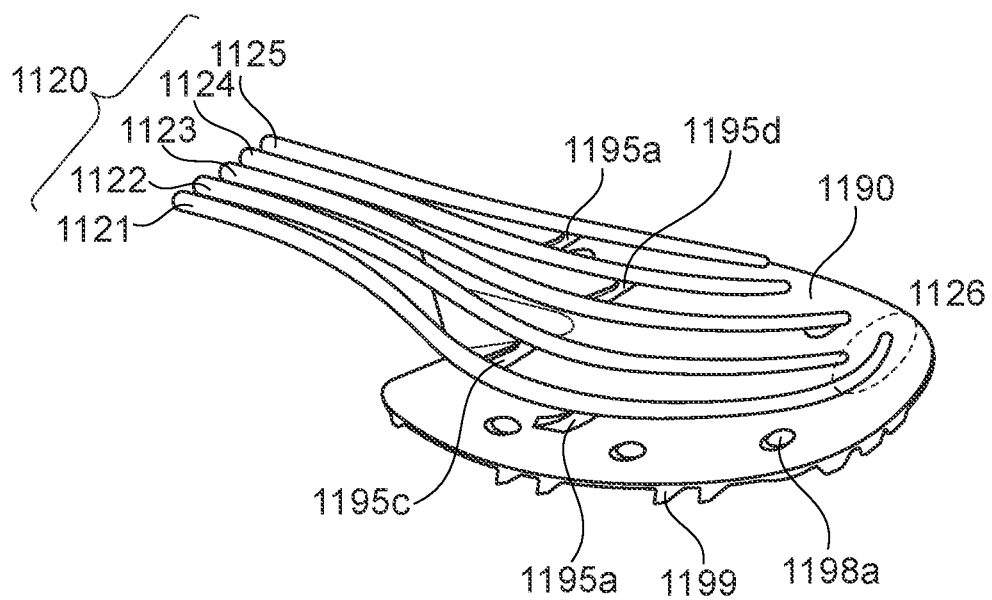
FIG. 11f shows a tilted medial side view of a reinforcing structure and support plate of a sole according to some embodiments

FIG. 11a shows a top view, FIG. 11b a bottom view, FIG. 11c a lateral side view, FIG. 11d a rear view, and FIG. 11e a tilted lateral side view of the reinforcing structure 1120 and a forefoot support plate 1190 with connectors 1195a-b between the two. FIG. 11f shows a tilted medial side view of a modification of the reinforcing structure 1120 and forefoot support plate 1190 with an increased number of connectors 1195a-d between the two.

The reinforcing structure 1120 has five reinforcing members 1121-1125, each corresponding to one toe/metatarsal bone of the foot. The reinforcing member 1121 corresponding to the big toe/first metatarsal bone also curls in underneath the big toe (e.g., the region 1126), to provide additional support for toe-off, as already discussed numerous times. In the exemplary embodiment shown here, all of the reinforcing members 1121-1125 have more or less (e.g. within a few percent, for example within 10%, or 5%, or 2%) the same diameter (understood, e.g., as their diameter at a certain cross-sectional plane or longitudinal position along the sole, or as their average diameter along their extension). In other cases, that may be different, though. Also, if the reinforcing members 1121-1125 are provided tube-shaped (i.e. have at least some hollow sections), their wall thickness may also vary. For example, the wall thickness of the members 1121 and 1123 may be larger, making them stiffer than the remaining members, as already discussed.

In other respects, the reinforcing structure 1120 is similar to, for example, the reinforcing structures 120, 220, or 920, and reference is therefore made to the corresponding statements above, for conciseness.

The forefoot support plate 1190 is arranged beneath the reinforcing structure 1120 in the present embodiment. However, it may in principle also be arranged above it. In the shown examples, the forefoot support plate 1190 also acts as an outsole or part of the outsole in the forefoot region of the sole. The forefoot support plate 1190 may, for example, be made from, or comprise a fiber-reinforced low-weight material to provide increased stiffness for a dynamic and efficient push-off, for example for running or sprinting shoes.

To further facilitate such a dynamic push-off and fast movements, the forefoot support plate 1190 of the shown embodiments comprises both profile elements 1199 to improve traction, as well as grommets or sockets 1198 into which spikes or cleats (not shown in FIGS. 11a-f) may be mounted either removably or permanently. In the embodiment shown in FIG. 11f, each socket 1198 is further fitted with a (e.g., plastic or metal) thread 1198a for such spikes or cleats to be removably screwed into.

In FIGS. 11a-e, the medial and lateral reinforcing members 1121 and 1125 are connected to the forefoot support plate 1190 by two connectors or wings 1195a and 1195b, respectively. In FIG. 11f, there are additional connectors 1195c and 1195d between the reinforcing members 1122 and 1124, respectively, and the forefoot support plate 1190. These connectors serve, for example, the purpose of further increasing the mechanical coupling and general rigidity of the forefoot support construction provided by the reinforcing structure 1120 and forefoot support plate 1190, and hence facilitate the transmission of high push-off force from the leg and foot to the ground.

What is not shown in FIG. 11a-f, for clarity of exposition, is the midsole material that will generally be arranged between the forefoot support plate 1190 and the reinforcing members 1121-1125, and into which the reinforcing members 1121-1125 will generally be at least partially embedded, as already discussed. Reference is therefore made in this regard to the explanations already given herein, for conciseness.

FIGS. 12a-i show a sole 1200 (or parts thereof) according to some embodiments having at least two reinforcing members extending in a front half of the sole, wherein at least a first one of the reinforcing members further extends rearwardly beyond the midfoot area and into a heel area of the sole and wraps up to a posterior portion of the ankle region.

Figure 12A:
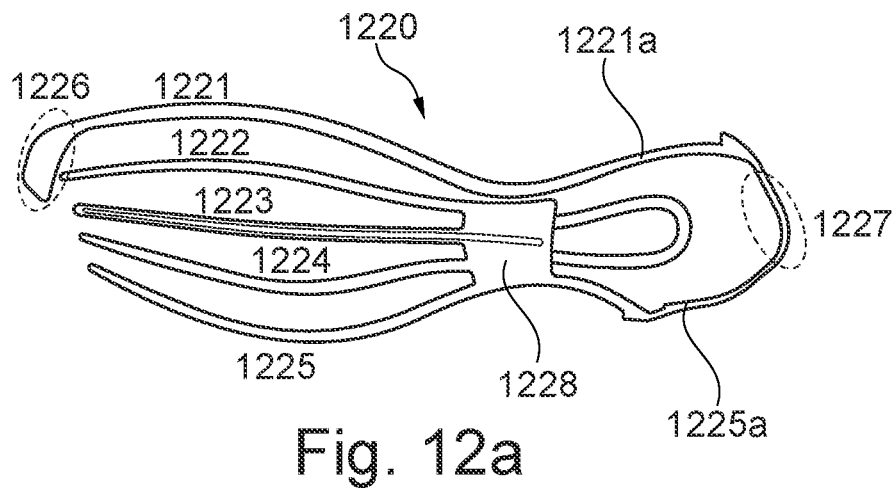
FIG. 12a shows a top view of a reinforcing structure of a sole according to some embodiments.
Figure 12B:
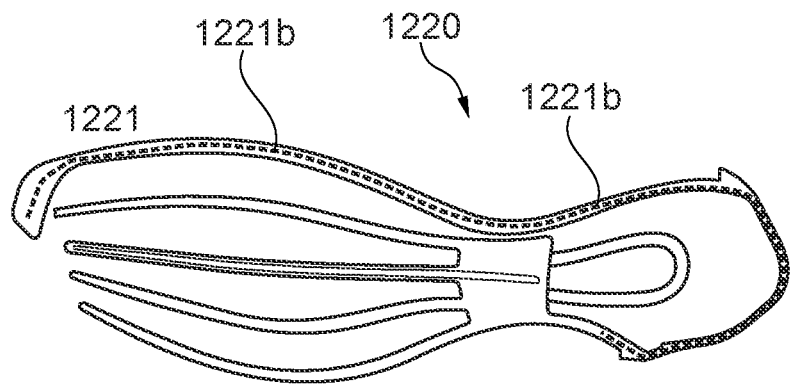
FIG. 12b shows a top view of a reinforcing structure of a sole according to some embodiments.
Figure 12C:
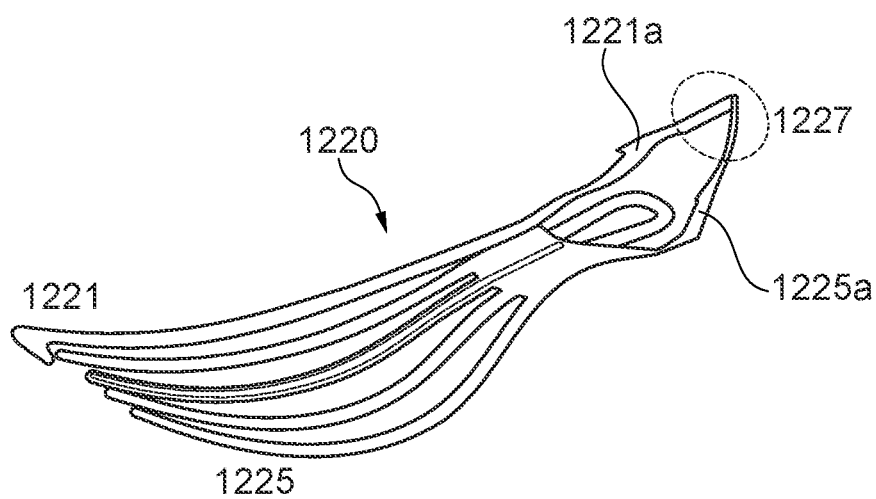
FIG. 12c shows a titled lateral side view of a reinforcing structure of a sole according to some embodiments.
Figure 12D:
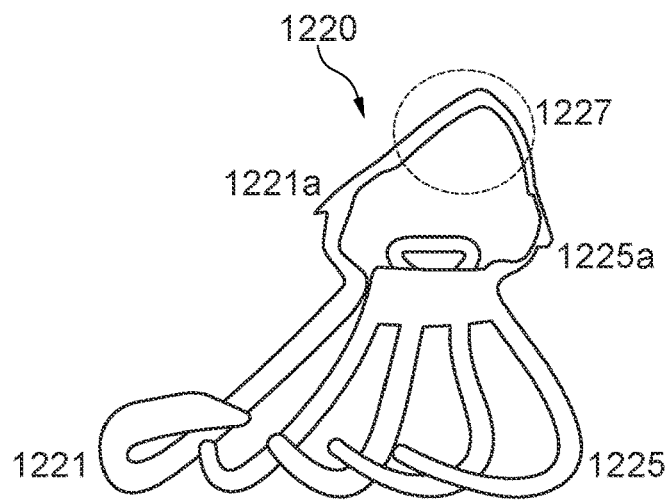
FIG. 12d shows a front view of a reinforcing structure of a sole according to some embodiments.
Figure 12E:
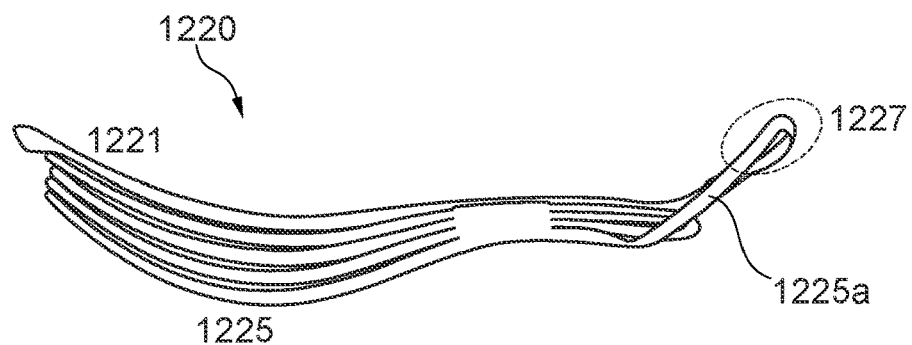
FIG. 12e shows a tilted lateral side view of a reinforcing structure of a sole according to some embodiments.
Figure 12F:
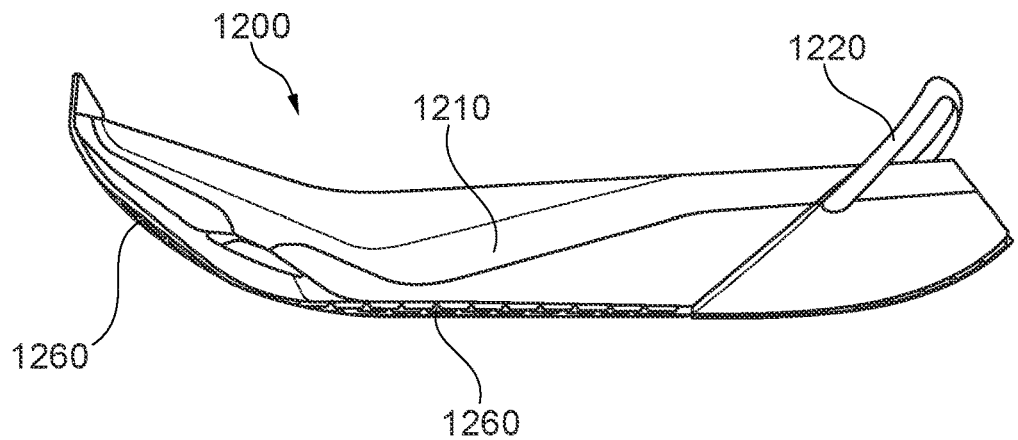
FIG. 12f shows a side view of a sole having a reinforcing structure embedded within the sole according to some embodiments.
Figure 12G:
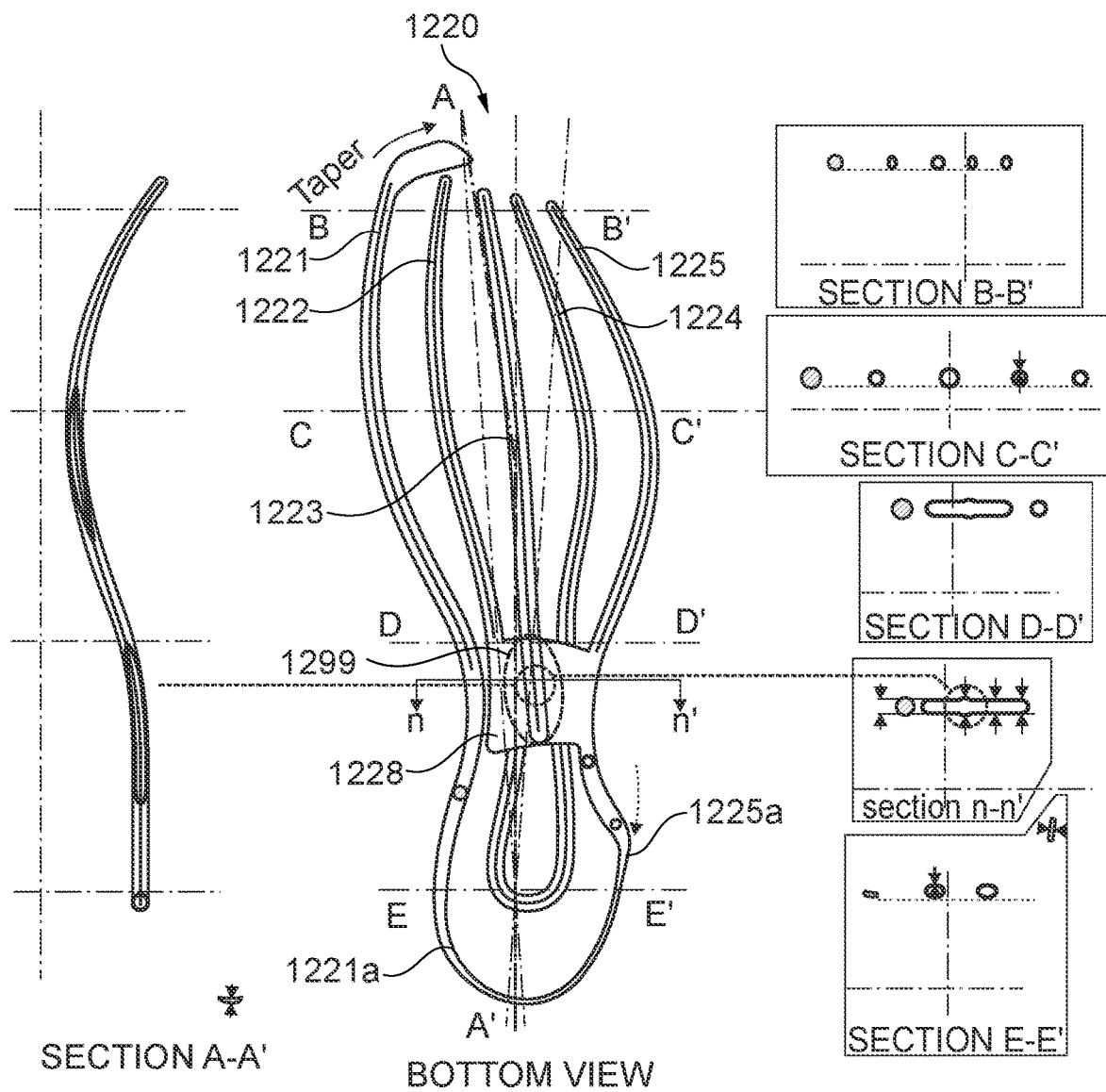
FIG. 12g is a constructional drawing of a sole according to some embodiments.
Figure 12H:
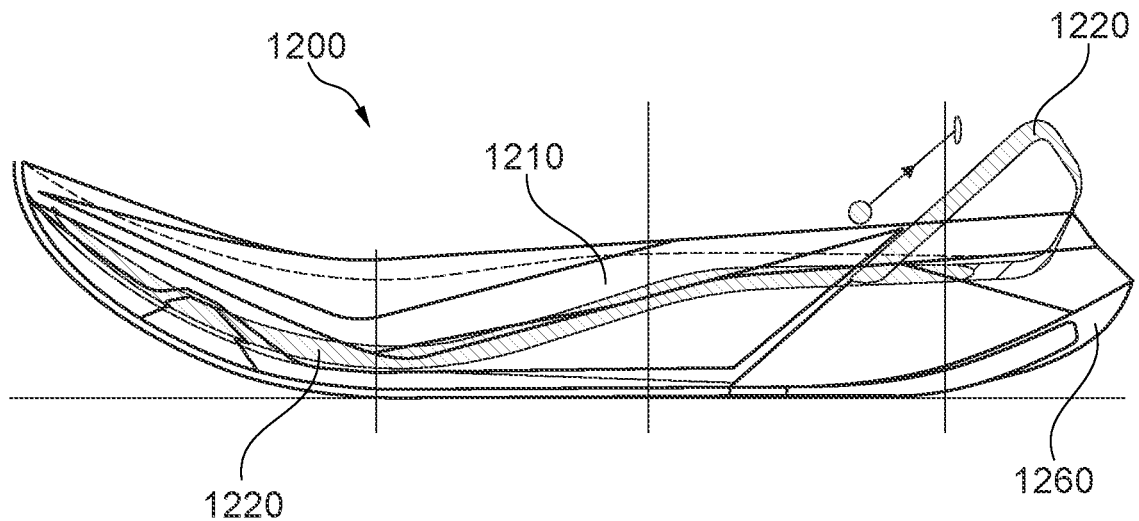
FIG. 12h is a constructional drawing of a sole according to some embodiments.
Figure 12I:
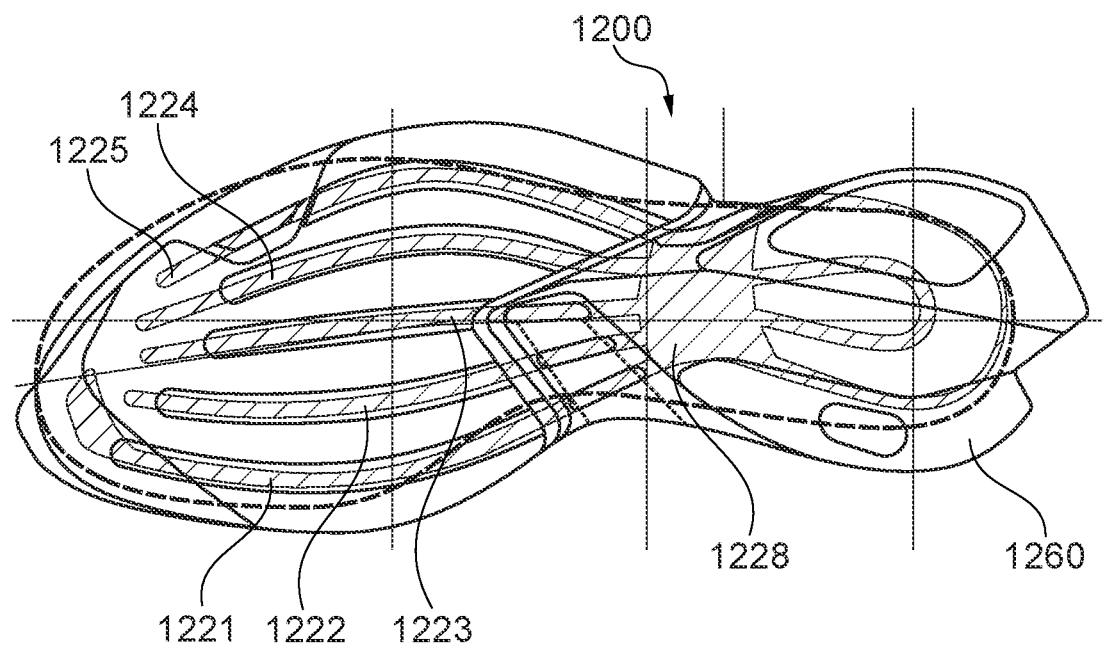
FIG. 12i is a constructional drawing of a sole according to some embodiments.

FIGS. 12a and 12b show a top view of the reinforcing structure 1220 of this sole 1200, FIG. 12c a tilted lateral side view, FIG. 12d a front view, FIG. 12e another tilted lateral side view, FIG. 12f an example of the reinforcing structure 1220 being embedded within a midsole 1210, and FIGS. 12g, 12h and 12i show constructional drawings pertaining to the sole 1200.

It is once again pointed out that everything that has been said or disclosed so far, in particular with regard to the embodiments and examples of FIGS. 1a-11f, may also apply (if not physically or technically impossible, of course) to the embodiments and examples described and disclosed in the following, even if not explicitly discussed in every detail.

The sole 1200 comprises a reinforcing structure 1220 containing five reinforcing members 1221-1225 extending in the front half of the sole 1200 and each corresponding to a toe/metatarsal bone of the foot (however, in other embodiments a smaller or larger number of reinforcing members is also possible, e.g. 2, 3, 4, 6, or 7 reinforcing members).

A first medial reinforcing member 1221 corresponds to the big toe/first metatarsal bone. A second lateral reinforcing member 1225 corresponds to the $5^{th}$ metatarsal bone. Between these two, three reinforcing members 1222, 1223, and 1224 are arranged, corresponding to the $2^{nd}$, $3^{rd}$, and $4^{th}$ metatarsal bone, respectively.

The first medial reinforcing member 1221 comprises a flattened or taper tip that extends towards the front edge/tip of the sole 1200 (as shown in FIGS. 12h and 12i) and curls in underneath the big toe (e.g. the region 1226), to provide additional support for toe-off.

The reinforcing members 1221 and 1223 corresponding to the $1^{st}$ and $3^{rd}$ metatarsal bones have a larger diameter than the remaining three reinforcing members 1222, 1224, and 1225. This can be seen from FIG. 12g, where several cross-sections through the reinforcing structure 1220 are shown. Going from medial to lateral (e.g. from member 1221 to member 1225), the indicated diameters of the five reinforcing members are: at their tips just in front of cross section B-B' 4 mm, 3 mm, 4 mm, 3 mm, and 3 mm; around the region of cross section C-C' 6 mm, 5 mm, 6 mm, 5 mm, and 5 mm; just in front of cross section D-D': 6 mm, 5 mm, 6 mm, 5 mm, and 5 mm. At every longitudinal position along the sole 1200, the reinforcing members 1221 and 1223 are therefore thicker, and hence stiffer and more resistant to deformation than the other members (a wall thickness of 1 mm is also indicated for some sections of the reinforcing members in FIG. 12g). However, the wall thickness is another parameter besides the diameter that may be varied among the reinforcing members 1221-1225 and/or along a given reinforcing member to change and influence their physical properties.

In the region of the arch of the foot, the reinforcing members 1222-1225 are further connected by a hollow connection region 1228 with a central surface bulge (as shown in the cross-section n-n' in FIG. 12g) to provide additional support and stability to this region of the sole 1200.

It is pointed out that in the center of the hollow connection region 1228, in the area indicated by the ellipse 1299, the dashed lines do not indicate a separate tube-shaped member, but a surface bulge on the hollow connection region 1228 which is slightly higher (6 mm) than the rest of this hollow midfoot connection region 1228 (5 mm) (as shown in the cross section n-n').

The first medial reinforcing member 1221 and the second lateral reinforcing member 1225 further extend rearwardly beyond the midfoot area and into the heel area of the sole and form sections 1221a and 1225a, respectively, that wrap up to the posterior portion of the ankle region and merge into each other behind the heel in region 1227 (see FIGS. 12c, 12d, 12e, 12f and 12h for information about the three-dimensional configuration of this region). In this manner, a support structure for the heel of a wearer is provided that locks the heel in place and allows for a particularly good transmission of forces and an increased lever during push-off and a sufficient stabilization of the foot.

To further promote this effect, and while most of the reinforcing members are preferably provided as hollow members, (e.g. tube-shaped as shown by the cross-sections in FIG. 12g), the first reinforcing member 1221 can be provided as a solid member, (e.g. rod-shaped). This is indicated in FIG. 12b by the dashed line 1221b, showing the (approximate) extension of this solid section of the reinforcing structure 1220. As mentioned, the remaining parts will preferably be provided as hollow structures (although not absolutely necessary), to save weight.

Irrespective of the additional support provided by the sections 1221a and 1225a and heel support, where the two are joined in the region 1227, the reinforcing members 1221-1225 are still configured to be independently deflected by forces acting on the sole during a gait cycle in the front half of the sole 1200, so that the corresponding advantages, which have already been discussed in detail, are not lost.

Finally, as already mentioned, FIGS. 12f, 12h, and 12i show examples of how the reinforcing structure 1220 may be implemented into and embedded within a midsole 1210 of the sole, and how it may be arranged in relation to the midsole 1210 and a potential outsole 1260.

Figure 13:
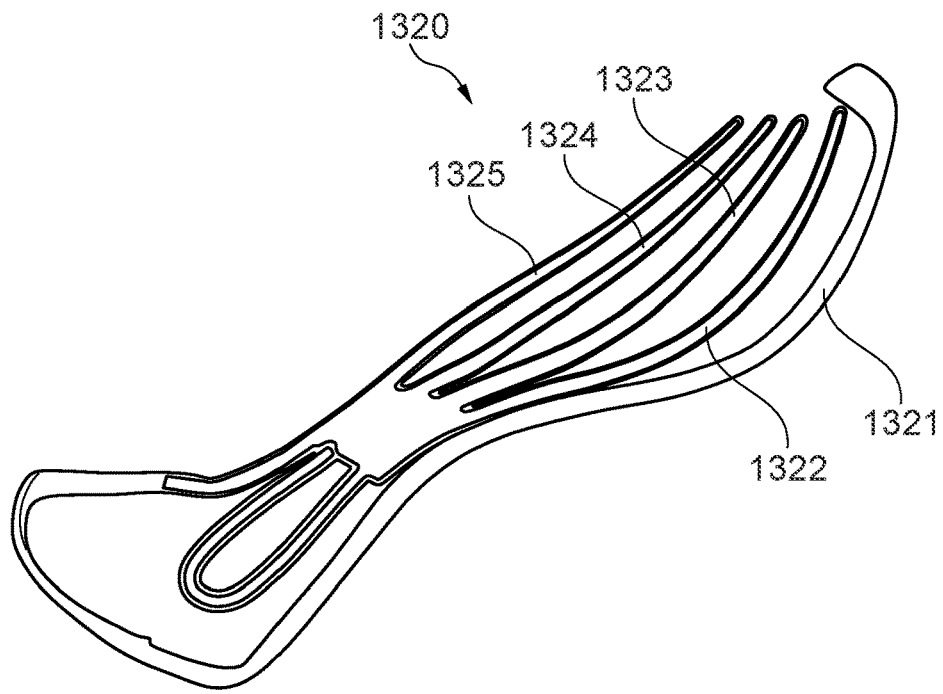
FIG. 13 shows a reinforcing structure of a sole according to some embodiments.

FIG. 13 shows another example of a reinforcing structure 1320 quite similar to the reinforcing structure 1220, in a tilted medial side view. It contains five reinforcing members 1321-1325 and all of the statements made above with regard to the reinforcing members 1221-1225 generally also apply to the reinforcing members 1321-1325. In the embodiment 1320 shown in FIG. 13, however, the core of the reinforcing members 1322-1325 is filled with a filling (e.g. plastic or metal) material, as indicated by the different color compared to the reinforcing member 1321 in FIG. 13.

Figure 14:
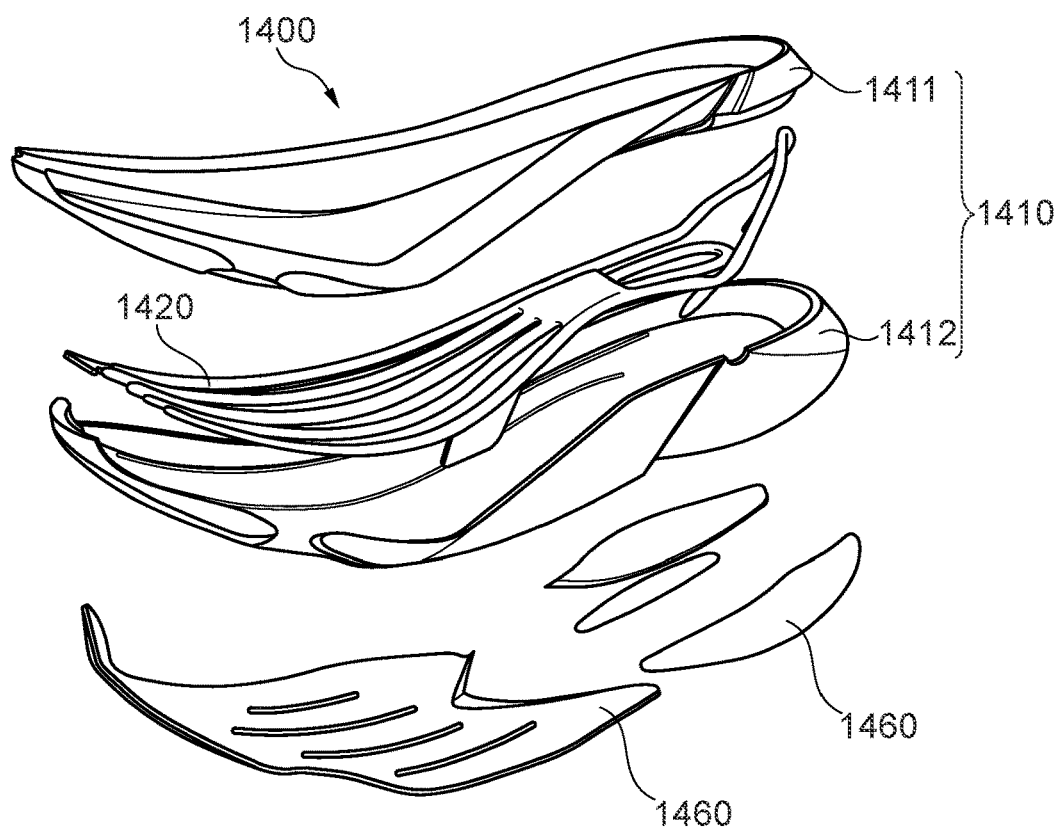
FIG. 14 shows an exploded isometric view of a sole according to some embodiments.

A further embodiment of a sole 1400 is shown in FIG. 14 in an exploded view. This embodiment includes a reinforcing structure 1420, which may be the reinforcing structure 1220 or 1320 just discussed. All of what has been said about the corresponding members, elements, and components of the reinforcing structures 1220 and 1320 also applies to the reinforcing structure 1420 (unless physically or technically ruled out, of course) and is therefore not repeated.

The sole 1400 comprises a midsole 1410 with an upper midsole part 1411 and a lower midsole part 1412, between which reinforcing structure 1420 is positioned. It is completely embedded within the midsole 1410. The sole also comprises an outsole 1460, which in the embodiment shown here comprises several individual sub-parts (this need not always be the case, however).

With regard to the different midsole parts 1411, 1412, the outsole 1460, and possible details and materials that may be used in this regard, reference is in particular made to the corresponding statements and explanations given with regard to these components in relation with FIGS. 1a-f, 2, 3a-b, 4, 5a-b, 6a-d, 7a-b, 8a-b, and 9a, which apply analogously here and are therefore not repeated again.

Figure 15A:
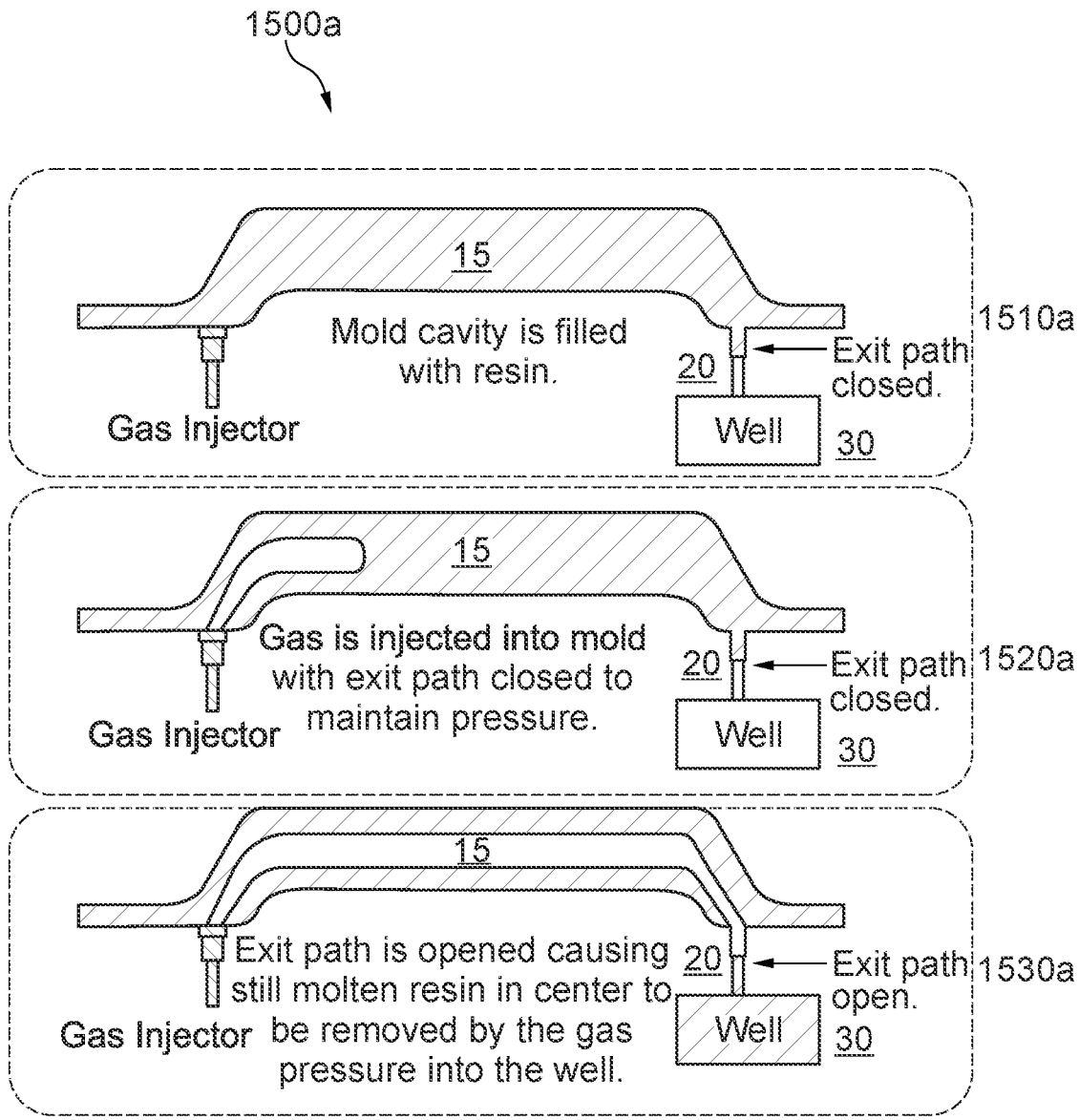
FIG. 15a shows a method for the manufacture of a reinforcing member according to some embodiments.
Figure 15B:
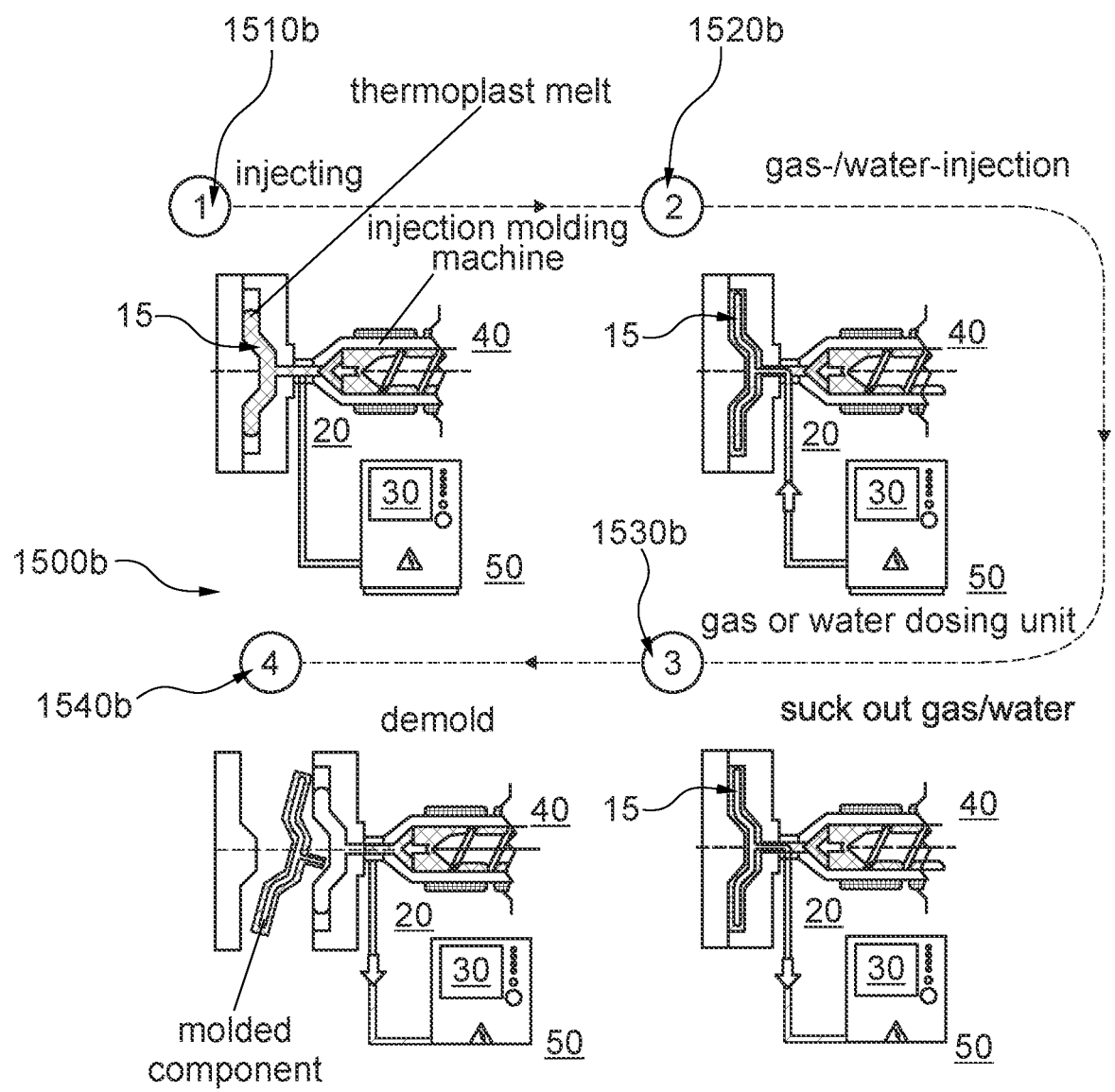
FIG. 15b shows a method for the manufacture of a reinforcing member according to some embodiments.

FIGS. 15a-b show methods 1500a and 1500b according to some embodiments for the manufacture of a reinforcing structure or part of a reinforcing structure for a shoe sole with at least one reinforcing member with a hollow section, for example the manufacture of any of the reinforcing structures 120, 220, 320, 420, 720, 820, 1020, 1120, 1220, 1320, 1420, or hollow part thereof discussed herein so far.

The following discussion will focus on the manufacture of one single hollow section of such a reinforcing structure for clarity of exposition, but a person of ordinary skill in the art will understand that the method may also be expanded to the manufacture of several such hollows section, potentially in combination with solid/non-hollow sections, on a single machine and in a single go. The component obtained by the method may, of course, also be subsequently joined, glued, connected, or secured to other components or parts to for the reinforcing structure if need be. Details about such steps will not be the focus of the following discussion, however.

The method 1500a comprises the step of injecting a liquid molding material into a molding cavity 15 of a mold, the molding cavity 15 having a shape corresponding to the outer dimensions of the reinforcing member with the hollow section that is to be manufactured (for clarity, the case of one hollow reinforcing member being manufactured is discussed here and shown in FIGS. 15a and 15b, but the generalization to and modifications necessary for more complicated configurations are clear to a person of ordinary skill in the art). The result of this step is shown at reference 1510a in FIG. 15a where the molding cavity 15 is filled with the (still liquid) molding material.

The liquid molding material may be a plastic material suitable for injection molding, for example, EVA, TPU, or some other material known to a person of ordinary skill in the art.

The method further comprises (see reference 1520a in FIG. 15a) the step of injecting a displacement gas into the molding cavity under pressure. Instead of a displacement gas, a displacement liquid could also be used, as explained below in relation to FIG. 15b. The displacement gas can be air or nitrogen, for example, or another gas which is preferably inert in the sense that it does not react with the liquid injection material but simply displaces it and pushes the injected material against the walls of the molding cavity 15.

To achieve this displacement of the injected material, during the above two steps. An exit path 20 leading to an outlet well 30 is closed, such that the gas pressure mounts and can be maintained within the molding cavity 15.

Once a sufficient amount of gas has been injected and a sufficient gas pressure been established, the exit path 20 is opened such that the pressurized displacement gas washes out the still liquid material from the center of the molding cavity 15 and into the outlet well 30, (see reference 1530a in FIG. 15a) thus creating a hollow tube of injected material in the molding cavity 15 that then solidifies to form the hollow section of the reinforcing member.

FIG. 15b shows a modified version 1500b of this method wherein the exit path 20 for removing the displacement medium from the molding cavity is also used as an injection path for the medium, so that the medium itself closes the exit path 20 during its injection under pressure into the molding cavity 15, which can simplify the operation of the machine.

At reference 1510b, a liquid material is injection molded by an injection molding machine 40 into a molding cavity 15 having a shape corresponding to the outer dimensions of the reinforcing member with the hollow section that is to be manufactured.

At reference 1520b, the method 1500b comprises injecting a displacement gas or liquid (e.g., water) into the molding cavity 15 under pressure. In the present case, this is done via an inlet path 20 that will also be used as exit path to wash out the liquid material from the center of the molding cavity 15. Since the displacement medium is injected via the path 20 into the molding cavity 15 under pressure, the medium itself seals off the path 20 as long as the injection pressure is kept up, and no additional valve or outline line is needed in this case.

This is done at reference 1530b, where the displacement gas or liquid is removed again from the molding cavity 15 via the path 20 and into an outlet well 30 within a corresponding unit 50, taking with it the liquid material still present in the center of the molding cavity 15 at this point in time.

Prior to the removal at reference 1530b, the injected molding material may be allowed to set or cure at least partially within the molding cavity 15, particularly at the walls of the molding cavity 15 (which may be heated for this purpose), while the material in the center is still kept in the liquid phase. This facilitates the removal of the unwanted molding material in the center of the molding cavity along with the removal of the displacement medium (this option also applies to the embodiment 1500a discussed above).

Afterwards, the component may be allowed to set and cure (e.g., while being actively cooled), and then be demolded, see reference 1540b in FIG. 15b.

In the following, further examples are described to facilitate the understanding of the present disclosure.

In a first example, a sole for a shoe, in particular a running shoe, comprising:

reinforcing members extending in a front half of the sole, wherein the reinforcing members are configured to be independently deflected by forces acting on the sole during a gait cycle.

In a second example, the sole according to example 1, wherein each of the reinforcing members comprises a non-linear section.

In a third example, the sole according to example 2, wherein the non-linear sections comprises a section having a concave shape in a side view of the sole.

In a fourth example, the sole according to one of examples 2-3, wherein each of the reinforcing members comprises a localized low point relative to a horizontal plane, and wherein each of the low points is located in the front half of the sole.

In a fifth example, the sole according to example 4, wherein each of the low points is located in a region between a midfoot area and a toe area of the sole.

In a sixth example, the sole according to example 5, wherein each of said low points is located in a region of the metatarsophalangeal joints.

In a seventh example, the sole according to one of examples 4-6, wherein each of the low points is located at a distance of at least 5 mm beneath a plane that is tangential to an upper side of a structure formed by the reinforcing members, preferably at least 8 mm.

In an eighth example, the sole according to example 7, wherein the distance between the tangential plane and each of the low points varies across the sole from a medial to lateral side.

In a ninth example, the sole according to one of examples 2-8, wherein the section of each reinforcing member with the non-linear shape extends at least from the midfoot area to the toe area of the sole.

In a tenth example, the sole according to one of examples 1-9, wherein the reinforcing members extend rearwardly beyond the midfoot area and into a heel area of the sole.

In an eleventh example, the sole according to one of examples 1-10, wherein the reinforcing members are plate-like members.

In a twelfth example, the sole according to one of examples 1-10, wherein the reinforcing members are rod-shaped and/or tube-shaped members.

In a thirteenth example, the sole according to example 11 or 12, wherein the reinforcing members comprise solid sections.

In a fourteenth example, the sole according to one of examples 11-13, wherein the reinforcing members comprise hollow sections.

In a fifteenth example, the sole according to one of examples 11-14, wherein a diameter of the reinforcing members varies between at least two of the reinforcing members and/or wherein a diameter of at least one of the reinforcing members varies along said reinforcing member.

In a sixteenth example, the sole according to one of examples 11-15, wherein there are five reinforcing members, each corresponding to a respective metatarsal bone.

In a seventeenth example, the sole according to example 16, wherein the reinforcing members corresponding to the first and the third metatarsal bone have a higher deflection stiffness than the three remaining reinforcing members.

In an eighteenth example, the sole according to one of examples 16-17, wherein the reinforcing members corresponding to the first and the third metatarsal bone have a larger diameter than the three remaining reinforcing members.

In a nineteenth example, the sole according to one of examples 1-18, wherein the reinforcing members comprise one or more of the following materials: carbon fibers, a carbon fiber composite material, a glass fiber composite material.

In a twentieth example, the sole according to one of examples 1-19, wherein at least two of the reinforcing members are connected by a connecting member.

In a twenty-first example, the sole according to one of examples 1-20, wherein the reinforcing members extend substantially along a longitudinal direction of the sole.

In a twenty-second example, the sole according to one of examples 1-21, wherein the reinforcing members are arranged next to each other in a medial-to-lateral direction.

In a twenty-third example, the sole according to example 22, wherein the reinforcing members are connected to a mesh-like material.

In a twenty-fourth example, the sole according to one of examples 1-23, further comprising a load distribution member arranged in a back half of the sole, preferably in the heel area of the sole.

In a twenty-fifth example, the sole according to example 24, wherein the load distribution member comprises a load distribution plate.

In a twenty-sixth example, the sole according to one of examples 24-25, wherein the load distribution member comprises one or more of the following materials: carbon fibers, a carbon fiber composite material, a glass fiber composite material.

In a twenty-seventh example, the sole according to one of examples 24-26, wherein the load distribution member extends into the midfoot area of the sole.

In a twenty-eighth example, the sole according to one of examples 24-27, wherein the reinforcing members and the load distribution member at least partially overlap.

In a twenty-ninth example, the sole according to one of examples 24-28, wherein the reinforcing members and the load distribution member are independent elements.

In a thirtieth example, the sole according to one of examples 1-29, wherein the reinforcing members are at least partially embedded within a midsole of the sole, and wherein the midsole comprises a plastic foam material.

In a thirty-first example, the sole according to example 30, wherein the reinforcing members are completely embedded within the midsole.

In a thirty-second example, the sole according to one of examples 30-31, wherein the midsole comprises a particle foam, in particular a particle foam comprising particles of expanded thermoplastic polyurethane, eTPU, particles of expanded polyamide, ePA, particles of expanded polyether-block-amide, ePEBA, and/or particles of expanded thermoplastic polyester ether elastomer, eTPEE.

In a thirty-third example, the sole according to one of examples 30-32, wherein the midsole comprises a homogeneous foam material.

In a thirty-fourth example, the sole according to one of examples 30-33, wherein the midsole comprises a lower midsole part and an upper midsole part, and wherein the reinforcing members are positioned between the lower midsole part and the upper midsole part.

In a thirty-fifth example, the sole according to example 34 in combination with one of examples 24-29, wherein the reinforcing members and the load distribution member are separated by the upper midsole part.

In a thirty-sixth example, the sole according to example 35, wherein the load distribution member is at least partially embedded within the upper midsole part.

In a thirty-seventh example, the sole according to one of examples 1-36, further comprising a sock-liner.

In a thirty-eighth example, the sole according to example 37 in combination with one of examples 35-36, wherein the sock-liner is arranged on top of the upper midsole part and at least partially covers the load distribution member.

In a thirty-ninth example, the sole according to one of examples 1-38, further comprising an outsole.

In a fortieth example, a shoe, in particular running shoe, comprising a sole according to one of the preceding examples 1-39.

What is claimed is:

1. A sole for a shoe, the sole comprising:
    a midsole;
    a reinforcing structure that comprises reinforcing members at least partially embedded in the midsole within a front half of the sole, wherein:
        a first one of the reinforcing members extends rearwardly beyond a midfoot area of the midsole and into a heel area of the midsole and forms a first section of the reinforcing structure behind the midfoot area;
        a second one of the reinforcing members extends rearwardly beyond the midfoot area and into the heel area and forms a second section of the reinforcing structure behind the midfoot area; and
        the first section and the second section wrap upward behind the heel area, and merge into each other behind the heel area.

2. The sole according to claim 1, wherein the reinforcing members are configured to be independently deflected by forces acting on the sole during a gait cycle.

3. The sole according to claim 1, wherein the first reinforcing member is a medial reinforcing member and the second reinforcing member is a lateral reinforcing member.

4. The sole according to claim 1, wherein the first reinforcing member further comprises a flattened tip extending into a region underneath the first metatarsophalangeal head.

5. The sole according to claim 1, wherein the reinforcing members are rods or tube-shaped members.

6. The sole according to claim 1, wherein a diameter of the reinforcing members varies.

7. The sole according to claim 1, wherein at least some of the reinforcing members comprise hollow sections, and wherein a wall thickness of the hollow sections varies.

8. The sole according to claim 1, wherein there are five reinforcing members, each corresponding to a respective metatarsal bone.

9. The sole according to claim 8, wherein the reinforcing members corresponding to the first and the third metatarsal bone have a higher deflection stiffness than the three remaining reinforcing members.

10. The sole according to claim 8, wherein the reinforcing members corresponding to the first and the third metatarsal bone have a larger diameter or larger wall thickness than the three remaining reinforcing members.

11. A shoe comprising a sole according to claim 1.

12. The sole according to claim 1, wherein the first section and second section are at least partially embedded in the midfoot area and extend out of the midsole behind the heel area.

13. The sole according to claim 1, wherein a third one of the reinforcing members is connected to the second one of the reinforcing members by a connection region of the reinforcing structure located in the midfoot area of the sole.

* * * * *